United States Patent
Marivoet et al.

(10) Patent No.: US 11,311,122 B2
(45) Date of Patent: Apr. 26, 2022

(54) FOLDABLE DISPLAY RACK WITH HINGED AND TELESCOPIC SIDE WALLS AND METHOD FOR THE BUILD-UP THEREOF

(71) Applicants: Pure Value Europe NV, Sint-Amands (BE); Pure Value Netherlands BV, BJ Noordwijk (NL)

(72) Inventors: Geert Marivoet, Sint-Amands (BE); Bram Schijndel, JT Noordwijk (NL); Sandy Defauw, Roeselare (BE); Francesco De Piero, Sint-Pieters-Woluwe (BE)

(73) Assignees: Pure Value Europe NV, Sint-Amands (BE); Pure Value Netherlands BV, Noordwijk (NL)

( * ) Notice: Subject to any disclaimer, the term of this patent is extended or adjusted under 35 U.S.C. 154(b) by 0 days.

(21) Appl. No.: 16/468,017

(22) PCT Filed: Dec. 12, 2017

(86) PCT No.: PCT/IB2017/057831
§ 371 (c)(1),
(2) Date: Jun. 10, 2019

(87) PCT Pub. No.: WO2018/109655
PCT Pub. Date: Jun. 21, 2018

(65) Prior Publication Data
US 2019/0328159 A1    Oct. 31, 2019

(30) Foreign Application Priority Data

Dec. 12, 2016 (BE) .............................. BE2016/5916
Dec. 12, 2016 (NL) ...................................... 2017976

(51) Int. Cl.
*A47B 43/00* (2006.01)
*A47F 5/10* (2006.01)
(Continued)

(52) U.S. Cl.
CPC .............. *A47F 5/108* (2013.01); *A47B 43/00* (2013.01); *A47B 45/00* (2013.01); *A47F 3/0439* (2013.01)

(58) Field of Classification Search
CPC ..... A47B 43/00; A47B 45/00; A47B 87/0207; A47B 31/04; A47B 87/0223; A47B 46/00;
(Continued)

(56) References Cited

U.S. PATENT DOCUMENTS 607,539 A * 7/1898 Camp ....................... G09F 5/02
                                                    190/17
866,727 A * 9/1907 Little ....................... G09F 5/02
                                                    190/17
(Continued)

FOREIGN PATENT DOCUMENTS

CN    103239074 A    8/2013
DE      1863469 U   12/1962
(Continued)

*Primary Examiner* — Hiwot E Tefera
(74) *Attorney, Agent, or Firm* — James Creighton Wray

(57) ABSTRACT

The invention relates to a display, a kit, and a method for displaying goods. The display has a compact and one or more built-up configurations. The display has shelves that can be supported by hingedly connected, slideably attached, and telescopic side walls. The kit has a display and an advertisement wall for the display. The method relates to the spacing of two shelves by means of two side walls by exerting a force on one of both shelves and hinging and sliding the side walls to a position in essence perpendicular to both shelves.

17 Claims, 18 Drawing Sheets

(51) Int. Cl.
*A47B 45/00* (2006.01)
*A47F 3/04* (2006.01)

(58) Field of Classification Search
CPC . A47B 87/0246; A47B 87/0253; B62B 3/022; B62B 2205/06; B62B 2205/32; B62B 3/005; B62B 2206/06; A47F 5/13; A47F 5/108; A47F 5/10; A47F 3/0439; G09F 5/02; A45C 7/0031
See application file for complete search history.

(56) References Cited

U.S. PATENT DOCUMENTS

| | | | | |
|---|---|---|---|---|
| 2,657,810 A * | 11/1953 | Garrick | | A47B 45/00 108/31 |
| 3,163,296 A | 12/1964 | Hohnstein | | |
| 4,249,749 A * | 2/1981 | Collier | | B62B 1/00 108/145 |
| 4,548,012 A * | 10/1985 | Dyer | | A47B 43/00 52/646 |
| 4,556,198 A * | 12/1985 | Tominaga | | A61G 7/012 254/122 |
| 5,738,365 A * | 4/1998 | McCarthy | | B62B 3/022 280/651 |
| 8,256,630 B2 | 9/2012 | Zhu | | |
| 8,424,883 B1 * | 4/2013 | Ramos | | B62B 3/02 280/35 |
| 8,505,960 B1 * | 8/2013 | Shindelar | | B62B 3/025 280/651 |
| 9,743,784 B2 * | 8/2017 | Piskor | | A47F 5/10 |
| 9,775,432 B2 * | 10/2017 | Ritter | | A47B 31/04 |
| 10,527,221 B2 * | 1/2020 | Grappe | | F16M 11/42 |
| 2005/0109723 A1 * | 5/2005 | Czerwinski | | A47B 47/0083 211/183 |
| 2005/0211576 A1 * | 9/2005 | Paquette | | B65D 7/26 206/139 |
| 2006/0103280 A1 | 5/2006 | Kubota | | |
| 2007/0001409 A1 * | 1/2007 | Kaplan | | A45C 9/00 280/35 |
| 2012/0248949 A1 * | 10/2012 | Herman Baran | | A47F 5/10 312/126 |
| 2013/0292925 A1 * | 11/2013 | Shindelar | | B62B 3/02 280/651 |
| 2014/0306584 A1 * | 10/2014 | DeMars | | A47F 9/00 312/140.2 |
| 2014/0360411 A1 * | 12/2014 | Hatter | | A47B 9/18 108/28 |
| 2015/0173508 A1 * | 6/2015 | Ma | | A47B 45/00 211/208 |
| 2015/0335176 A1 * | 11/2015 | Piskor | | A47B 87/0207 211/1.3 |
| 2016/0037913 A1 * | 2/2016 | Franck | | A47B 57/20 211/208 |
| 2016/0106236 A1 * | 4/2016 | Kwiatek | | A47F 10/00 108/50.11 |

FOREIGN PATENT DOCUMENTS

| | | |
|---|---|---|
| DE | 1166986 B | 4/1964 |
| EP | 1535535 A2 | 6/2005 |
| GB | 2011251 A | 7/1979 |
| WO | 9532651 A1 | 12/1995 |
| WO | 2011104623 A1 | 9/2011 |

\* cited by examiner

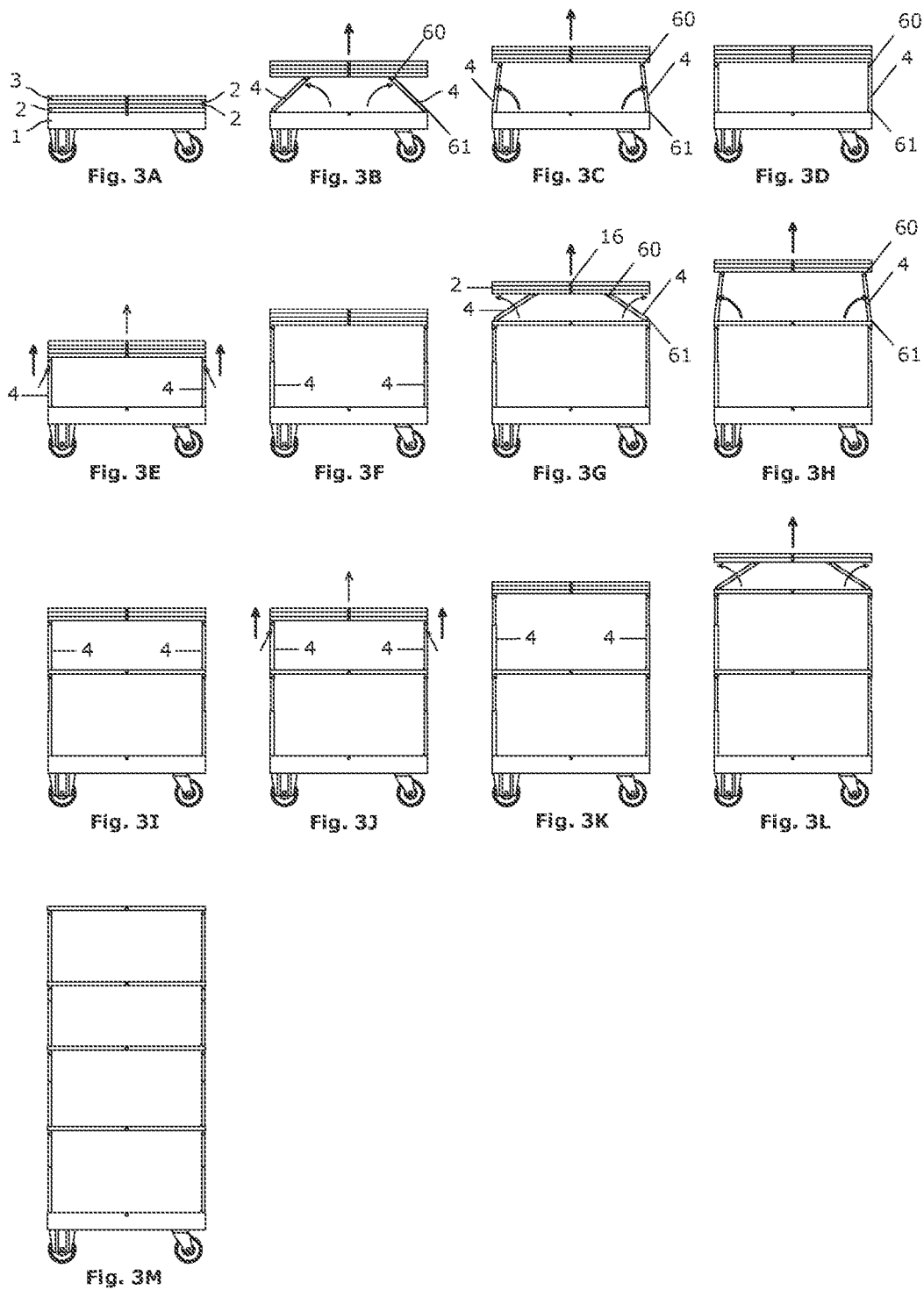

FOLDABLE DISPLAY RACK WITH HINGED AND TELESCOPIC SIDE WALLS AND METHOD FOR THE BUILD-UP THEREOF

This application claims the benefit of Belgian Application No. BE2016/5916 filed Dec. 12, 2016, Netherlands Application No. 2017976 filed Dec. 12, 2016 and PCT/IB2017/057831 filed Dec. 12, 2017, International Publication No. WO 2018/109655 A1, and the amended sheets from the IPER, which are hereby incorporated by reference in their entirety as if fully set forth herein.

TECHNICAL DOMAIN

The invention relates to a display and a method for displaying goods. The display has a folded configuration and one or more built-up configurations. The invention corresponds to IPC A47B 43/00 and IPC A47B 45/00.

STATE OF THE ART

WO 2011/104 623 describes a telescopic display structure with multiple columns, each having at least two hollow parts, in which a portion of the second part can slide into the first part. The display structure comprises frames for shelves that are spaced by means of the columns.

Because the columns comprise hollow parts with a minimal length, the frames cannot slide one adjacent to the other which does not result in an optimal compactness for the transport of the display structure. Furthermore, the display structure does not comprise a variable number of frames and/or shelves because the minimal length of the hollow parts involves a non-negligible minimal spacing of the frames. Furthermore, building up of the display structure requires simultaneous pulling of a first frame, holding still a second frame, and pushing-in several attachment elements for telescopically extending the columns. This combination of operations is difficult or impossible to realize by one single person. Furthermore, objects can also easily fall through the side walls of the display structure. Indeed, the side walls do not comprise a means for supporting e.g. standing books.

CN 103 239 074 describes a portable and foldable display comprising a rectangular frame. The rectangular frame comprises four columns, a bottom plate comprising through-holes in the four corners, and attachments clamps. The columns are telescopic metal connection rods.

The display comprises shelves that can be spaced by means of the columns. Because the columns comprise telescopic parts with a minimal length, the shelves cannot slide one adjacent to the other which does not result in an optimal compactness for the transport of the display structure. Furthermore, the goods display also does not comprise a variable number of shelves that can be built-up. Furthermore, objects can also easily fall through the side planes of the goods display. Indeed, the side planes do not comprise a means for supporting e.g. standing books.

U.S. Pat. No. 8,256,630 describes a frame structure with two side panels and a foldable frame coupled to the side panels for folding between a built-up and a folded configuration. The foldable frame comprises a connection piece that is supported between the side panels, a slideable hinging point coupled in a sliding way to the connection piece, and two foldable arms connecting the connection piece to the side panels. Each of the foldable arms has an upper end that is hingedly coupled to the slideable hinging point and a lower end that is hingedly coupled to a side panel.

The frame structure does not comprise a variable number of shelves that can be built up. Moreover, the distance between the shelves cannot be set.

The present invention aims to find a solution for at least some of the above-mentioned problems.

SUMMARY OF THE INVENTION

In a first aspect, the invention relates to a display for displaying goods. The display comprises a first shelf, a second shelf, and a pair of telescopic side walls. The display is configured for hingedly connecting the side walls to the first shelf and slideably attaching the side walls to the second shelf.

In a preferred embodiment, each of the side walls comprises a lower edge and an upper edge. The side walls are configured for supporting the second shelf. The first shelf is arranged for hingedly connecting both lower edges of the pair of side walls. The second shelf is arranged for slideably attaching both upper edges of the pair of side walls. Each of the side walls is arranged telescopically for setting at least two different distances between the lower edge and the upper edge.

In a preferred embodiment, the pair of side walls that are hingedly connected to the first shelf and slideably attached to the second shelf comprise a supporting configuration, in which the side walls are essentially perpendicular to both shelves. Preferably, the pair of side walls can be collapsed towards each other from the supporting configuration.

In a second aspect, the invention relates to a kit comprising a display according to the first aspect of the invention and a housing for the display. The display comprises an intended configuration. The kit is arranged for attaching the housing to the display in the intended configuration. The housing comprises an advertisement wall that is appropriate for at least partially covering the shelves and/or the side walls of the display in the intended configuration. The advertisement wall of the attached housing is furthermore configured for taking off products of at least one of the shelves.

In a third aspect, the invention relates to a method for spacing a first and a second shelf for displaying goods. Two side walls are provided for supporting the second shelf on the first shelf in a spaced way. The second shelf is initially positioned on the first shelf. The side walls are hereby positioned between the first shelf and the second shelf, and are substantially parallel to both shelves. Each of the side walls comprises a first and a second edge. An upward force is applied to the second shelf. Hereby, for at least one of the side walls:

a. the first edge is slid in an essentially parallel way to the surface of one of both shelves; and/or b. the side wall is rotated around a rotation axis, in which the rotation axis is essentially coaxial to the second edge and essentially parallel to a surface of one of both shelves; and/or c. the distance between the first and the second edge is changed.

The invention is advantageous because of several reasons.

First of all, the display comprises a compact transport configuration in which all shelves are essentially stacked one to the other and the pair of side walls are positioned between the shelves. Hereby, the minimal dimensions of the transport configuration are essentially determined by the thickness of the shelves.

A second advantage relates to the easy transition between the transport configuration and the built-up configuration. Because a pair of side walls are hingedly connected to an underlying (first) shelf and slideably attached to an upper (second) shelf, the side walls are also automatically erected when the upper shelf is lying on the underlying shelf, by exerting an upward force onto the upper shelf. Hereby, a pair of hands of a single operator are sufficient for lifting the upper shelf.

A third advantage relates to the presence of side walls. They can help avoiding that objects fall out of the display. Furthermore, the kit comprises a housing that can cover still more side walls for further avoiding that objects fall out of the display.

A fourth advantage relates to the adaptability of the distance between the different shelves thanks to the telescopic side walls.

DESCRIPTION OF THE FIGURES

FIGS. 1A-1D, 2, 3A-3M, 4A-4D, 7, 9A-9F, 10A-10F and 12A-12N are schematic illustrations of embodiments of displays and/or methods according to the present invention.

DETAILED DESCRIPTION

Figure 1A:
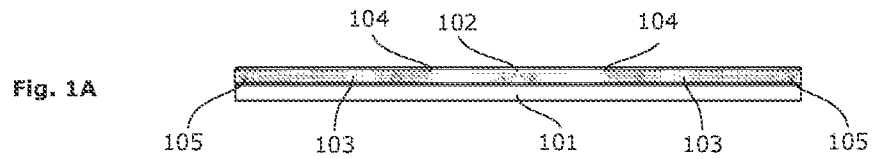

The invention relates to a display, a kit, and a method for displaying goods. In the detailed description, the three aspects according to the present invention will be further illustrated by means of preferred embodiments, figures and examples.

Unless otherwise specified, all terms used in the description of the invention, including technical and scientific terms, shall have the meaning as they are generally understood by the worker in the technical field of the invention. For a better understanding of the description of the invention, the following terms are explained specifically.

"A", "an" and "the" refer in the document to both the singular and the plural form unless clearly understood differently in the context. "A segment" means for example one or more than one segment.

When "approximately" or "about" are used in the document together with a measurable quantity, a parameter, a period or moment, etc., variations of +/−20% or less, preferably +/−10% or less, more preferably +/−5% or less, still more preferably +/−1% or less, and even still more preferably +/−0.1% or less than and of the cited value are meant, as far as such variations apply to the invention that is described. It will however be clearly understood that the value of the quantity at which the term "approximately" or "about" is used, is itself specified.

The terms "include", "including", "consist", "consisting", "provide with", "contain", "containing", "comprise", "comprising" are synonyms and are inclusive of open terms that indicate the presence of what follows, and that do not exclude or prevent the presence of other components, characteristics, elements, members, steps, known from or described in the state of the art.

In this document, the term "wireless communication" refers to any technology for transmitting data in a wireless way. A non-limiting list of examples of signals that can be sent and/or received by means of wireless communication involves mechanic waves, acoustic waves, electromagnetic waves, radio waves and light signals. A non-limiting list of examples of technologies for wireless communication comprises 2G, 3G, 3G+, 3GPP, 4G, 4G+, 5G, 6 LowPAN, Bluetooth, Bluetooth 4.0, Bluetooth 4.1, Bluetooth 4.2, Bluetooth 5, Bluetooth Low-Energy, CDMA, CDMA2000, Cellular, Dash7, EDGE, EDGE Evolution, EV-DO, Flash-OFDM, GPRS, GSM, HIPERMAN, HSPA, iBurst, IEEE 802.11a, IEEE 802.11ac, IEEE 802.11b, IEEE 802.11g, IEEE 802.11n, IEEE 802.15.4, IEEE 802.15.4-2006, IEEE 802.16, IEEE 802.16-2009, IEEE 802.16m, IEEE 802.20, IPv4, IPv6, LoRaWAN, Low Rate WPAN, LTE, Narrow-Band-IoT, Near Field Communication, Neul, RFID, RTT, Sigfox, Thread, UMTS, UMTS W-CDMA, UMTS-TDD, UWB, Weightless, Wi-Fi, WiMAX, Wireless USB, WLAN, WWAN, ZigBee and Z-Wave.

In a first aspect, the invention relates to a display for displaying goods. FIGS. 1 and 9 show schematic illustrations of embodiments of displays according to the present invention. The display comprises a first shelf (101), a second shelf (102), and a pair of telescopic side walls (103). The display is configured for hingedly connecting (105) the side walls (103) to the first shelf (101) and slideably attaching (104) the side walls (103) to the second shelf (102).

In a preferred embodiment, each of the side walls (103) comprises a lower edge and an upper edge. The side walls (103) are configured for supporting the second shelf (102). The first shelf (101) is arranged for hingedly connecting (105) both lower edges of the pair of side walls (103). The second shelf (102) is arranged for slideably attaching (104) both upper edges of the pair of side walls (103). Each of the side walls is arranged telescopically for setting at least two different distances between the lower edge and the upper edge.

In a preferred embodiment, the pair of side walls (103) that are hingedly connected (105) to the first shelf (101) and slideably attached (104) to the second shelf (102) comprises a supporting configuration (FIGS. 1C and 9C), in which the side walls (103) are essentially perpendicular to both shelves (101, 102). Preferably, the pair of side walls (103) can be collapsed towards each other from the supporting configuration (transition FIG. 1C to 1B; transition FIG. 9C to 9B).

In a second aspect, the invention relates to a kit comprising a display according to the first aspect of the invention and a housing for the display. FIGS. 6 and 14 show schematic illustrations of embodiments of kits according to the present invention. The display (601) comprises an intended configuration. The kit is arranged for attaching the housing (602, 603) to the display (601) in the intended configuration. The housing (602, 603) comprises an advertisement wall (603) that is appropriate for at least partially covering the shelves and/or the side walls of the display in the intended configuration. The advertisement wall (603) of the attached housing is furthermore configured for taking off products of at least one of the shelves (FIGS. 6D, 6E, 14C and 14E).

Figure 1B:
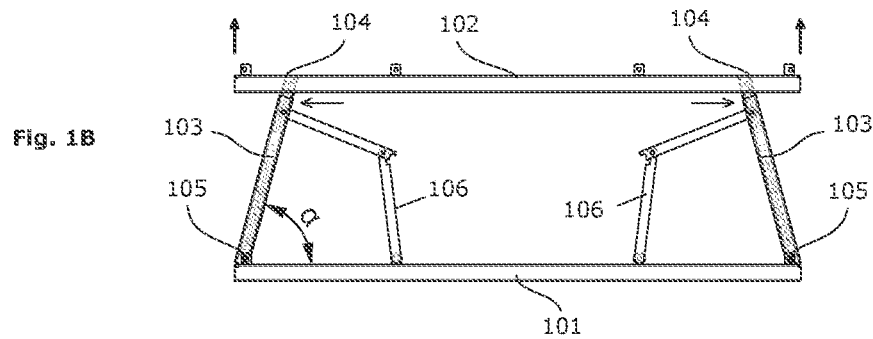
Figure 1C:
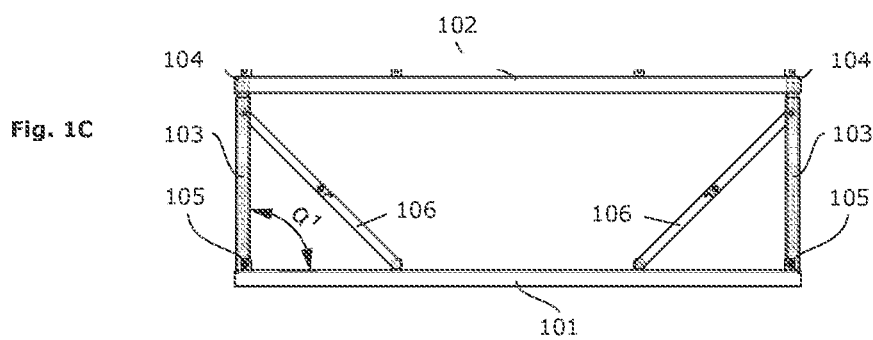
Figure 1D:
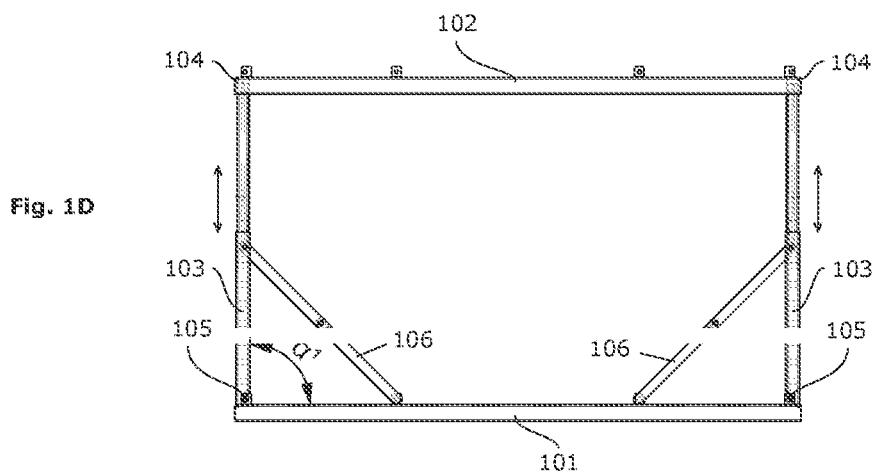
Figure 9A:
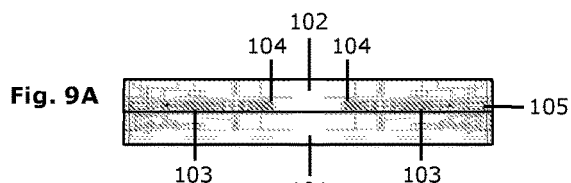
Figure 10A:
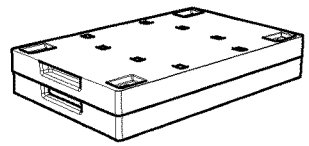
Figure 9B:
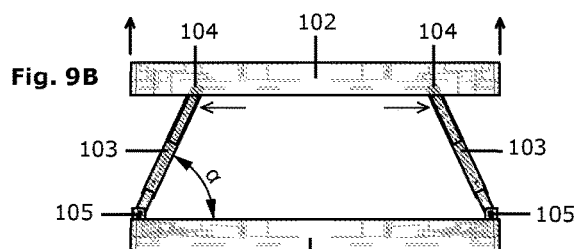
Figure 10B:
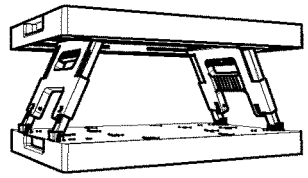
Figure 9C:
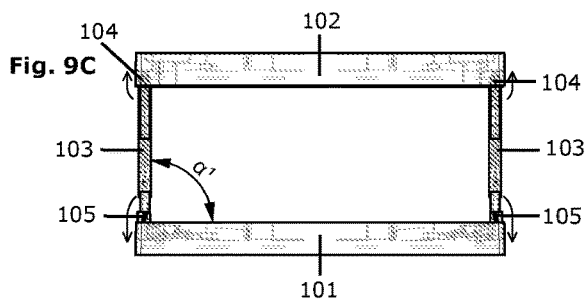
Figure 9F:
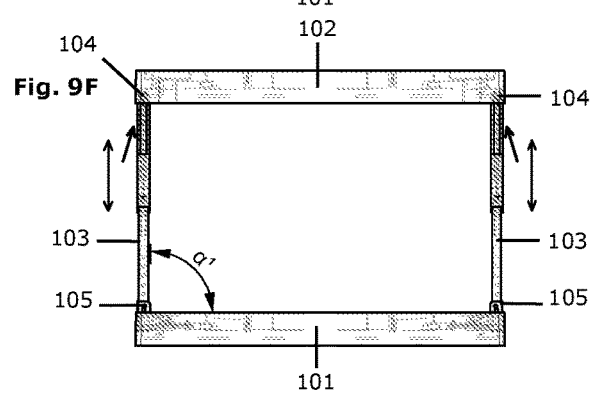

In a third aspect, the invention relates to a method for spacing a first (101) and a second (102) shelf for displaying goods. Two side walls (103) are provided for supporting the second shelf (102) onto the first shelf (101) in a spaced way. The second shelf (102) is initially positioned on the first shelf (101) (FIGS. 1A and 9A). The side walls (103) are hereby positioned between the first shelf (101) and the second shelf (102), and are substantially parallel to both shelves (101, 102). Each of the side walls (103) comprises a first and a second edge. An upward force is exerted to the second shelf (102). Hereby, for at least one of the side walls (103):

a. the first edge is slid (104) in an essentially parallel way to the surface of one of both shelves (FIGS. 1B and 9B); and/or b. the side walls are rotated around a rotation axis (105) (FIGS. 1B and 9B; angle α), in which the rotation axis is essentially coaxial to the second edge and essentially parallel to a surface of one of both shelves; and/or c. the distance between the first and the second edge is changed (FIGS. 1D and 9F).

The invention is advantageous because of several reasons. First of all, the display comprises a compact transport configuration in which all shelves are essentially stacked one onto the other and the pair of side walls are positioned between the shelves (FIGS. 1A, 3A, 4A, 8A, 8B, 8C, 9A, 12A and 17A). Hereby, the minimal dimensions of the transport configuration are essentially determined by the thickness of the shelves.

A second advantage relates to the easy transition between the transport configuration and the built-up configuration. Because a pair of side walls are hingedly connected to an underlying (first) shelf and are slideably attached to an upper (second) shelf, the side walls are also automatically erected when the upper shelf is lying onto the underlying shelf, by exerting an upward force on the upper shelf (FIGS. 1B and 9B). Hereby, a pair of hands of a single operator are sufficient for lifting the upper shelf (102).

A third advantage relates to the presence of side walls (103). They can help avoiding that objects fall out of the display. Furthermore, the kit comprises a housing (602, 603) that can cover still more side walls for further avoiding that objects fall out of the display.

A fourth advantage relates to the adaptability of the distance between the different shelves thanks to the telescopic side walls (FIGS. 1D and 9F).

In a preferred embodiment of the method, the sliding (step a.) and rotating (step b.) are realized simultaneously and for both side walls at the same time (FIGS. 1B and 9B) till both side walls are positioned essentially perpendicular to both shelves (FIGS. 1C and 9C). Then, the distance between the first and the second edge of both side walls can be changed simultaneously (step c.) (FIGS. 1D and 9F).

Said steps of the method can be realized manually. As an alternative, said steps can also be machine-executed. Furthermore, the method can also comprise the machine application of a housing. The method can also comprise machine placement of goods on at least one of the shelves. In this way, in a production environment, the display can be built-up by a machine, it can be covered with the housing and filled with products, after which the filled display is transported to a shop. In the shop, the empty display can then be collapsed to the transport configuration, and subsequently be returned to the production environment.

In an alternative embodiment of the method, the second shelf (102) could be lifted first at one side. Hereby, both side walls (103) are rotated hingedly around the hinged connection (105), but the upper edge of only one of both side walls (103) is moved with respect to the second shelf (102) via the sliding attachment (104). Subsequently, the upper edge of the other side wall can then be moved with respect to the second shelf (102) via the sliding attachment (104). In this way, both side walls (103) are standing upright, for supporting the second shelf (102) onto the first shelf (102) in a spaced way, with both side walls (103) essentially orthogonal to both shelves (101, 102) (FIGS. 1C and 9C).

FIGS. 2, 4D, 11 and 15A show embodiments of displays according to the present invention comprising at least two shelves. The display comprises a lower shelf (1, 1303), an upper shelf (3; 1301) and zero, one or more intermediate shelves (2; 1302). The lower shelf, the upper shelf and each of the intermediate shelves comprises an upper side and a lower side. The display further comprises one or more pairs of side walls (4, 1306, 1307, 1308, 1311) for supporting an intermediate shelf or the upper shelf. Each of the side walls comprises a lower edge and an upper edge. The number of pairs of side walls is preferably equal to one more than the number of intermediate shelves. The upper side of each intermediate shelf and of the lower shelf is configured for hingedly connecting (61; 1324) both lower edges of a pair of side walls. Hereby, preferably, the hinging axes of the pair of side walls are essentially parallel. The lower side of each intermediate shelf and of the upper shelf is configured for slideably attaching (60; 1321) both upper edges of a pair of side walls. Each of the side walls is arranged telescopically (1306, 1311) for setting (1307, 1308) at least two different distances between the lower edge and the upper edge. A pair of side walls that are hingedly connected to a first shelf and that are slideably attached to a second shelf comprise a supporting configuration, in which the side walls are essentially perpendicular to both shelves. Preferably, the side walls of said pair are essentially parallel to each other in the supporting configuration. The pair of side walls can be collapsed to each other in the supporting configuration.

FIG. 1 shows a schematic illustration of a preferred embodiment of a display and a method for the build-up thereof. The display comprises at least two shelves (101, 102) that can be spaced by means of a pair of side walls (103). Each of the shelves (101, 102) comprises an upper side and a lower side. Each of the side walls (103) comprises a lower edge and an upper edge. The upper side of the underlying shelf (101) and the lower edge of the side walls (103) are configured for hingedly connecting (105) the side walls (103) to the upper side of the underlying shelf (101). Hereby, the hinging axes (105) of both side walls (103) are essentially parallel. Furthermore, the lower side of the upper shelf (102) and the upper edge of the side walls (103) are configured for slideably attaching the side walls (103) to the lower side of the upper shelf (102). The side walls (103) are further arranged telescopically for setting at least two different distances between the lower edge and the upper edge. Hereby, the side walls can be arranged for supporting the upper shelf in a stable way at a discrete number of distances from the underlying shelf. The side walls can also be arranged for supporting the upper shelf in a stable way at a continuum of distances from the underlying shelf.

In an embodiment, the display comprises a positioning element (106) for each side wall. The positioning element (106) is appropriate for restraining and supporting a hingedly connected side wall and comprises two elongated rigid supporting elements. A first supporting element comprises a hinging point for attachment to the underlying shelf (101). The second supporting element comprises a hinging point for attachment to the side wall (103). Both supporting elements further comprise a third hinging point where the supporting elements are connected to each other. The third hinging point of the supporting elements allows a hinging movement of the side walls (103) with respect to the underlying shelf. Preferably, the positioning elements are all attached to the same side plane of the display, i.e. the back plane.

The positioning elements are advantageous because it improves the stability of the support by the side walls. Furthermore, the side walls cannot fold over outwardly thanks to the positioning elements. The attachment of the positioning elements to the back plane allows to install the goods in the display in an unhindered way and to take them out of display at the front side, i.e. the plane lying opposite to the back plane.

In FIGS. 1A and 9A, the upper shelf (102) is lying onto the underlying shelf (101). The two side walls (103) for supporting the upper shelf (102) onto the underlying shelf (101) in a spaced way are positioned between the shelves (101, 102). Hereby, the side walls (103) are essentially parallel to both shelves (101, 102). By exerting an upward force (FIGS. 1B and 9B) to the upper shelf (102), the upper shelf (102) is moved upwards. The upward force is transferred to the side walls (103) via the sliding attachment (104). As a result, the sliding attachments are slid towards the ends of the upper shelf (102) simultaneously, and the angle α between the side walls (103) and the underlying shelf (101) increases. If positioning elements (106) are present, they are also folded open at the third hinging point. Eventually, the side walls (103) are brought into a position in which they are mutually essentially parallel and in which they are essentially perpendicular to both shelves (FIGS. 1C and 9C). Hereby, the angle α' is about 90°. Preferably, the angle α' is at least 85° and at most 95°, more preferably at least 87° and at most 93°, and most preferably at least 89° and at most 91°. Furthermore, the side walls are also telescopically extendible. Once the side walls are essentially perpendicular to the underlying shelf, the side walls can be extended or shortened, i.e. the distance between the lower edge and the upper edge of each side wall can be changed, by exerting a further upward or downward force (FIGS. 1D and 9F).

In a preferred embodiment of the display, the upper side of an underlying shelf comprises a pair of attachment means, in which each attachment means comprises two or more essentially aligned attachment holes. Preferably, each attachment means comprises at least four attachment holes. Furthermore, the lower edge of each side wall comprises two or more essentially aligned hinging holes. Preferably, each side wall comprises at least four hinging holes. The side walls can be hingedly connected to the underlying shelf by applying one or more cylindrical connection systems through one or more attachment holes and through one or more hinging holes. Preferably, two connection systems are applied per side wall, in which each connection system is applied through two connection holes and two hinging holes. An example of a connection system is a bolt that can be closed off by a nut.

Figure 10C:
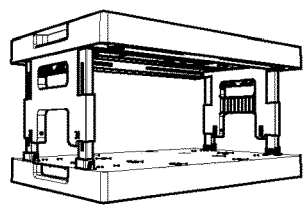
Figure 9D:
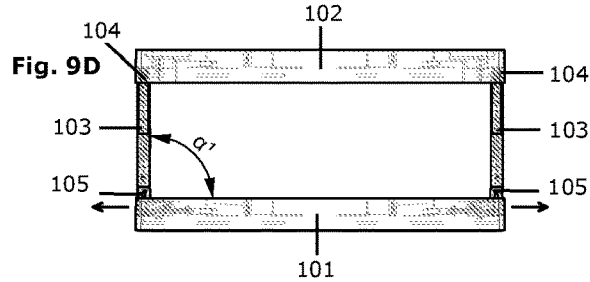
Figure 10D:
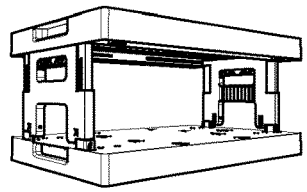
Figure 9E:
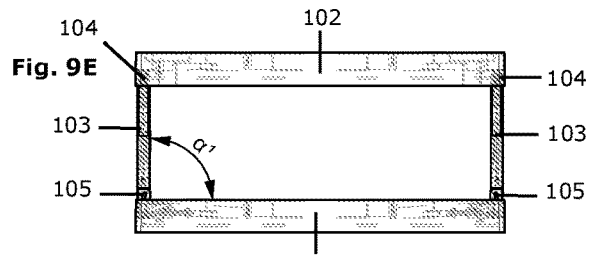
Figure 10E:
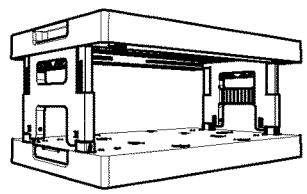
Figure 10F:
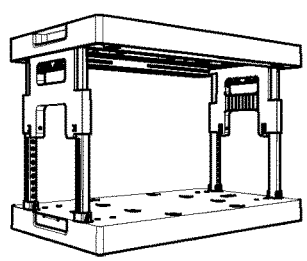

In a preferred embodiment, the first shelf comprises a pair of attachment means, in which each attachment means comprises two or more, preferably four, hinging openings (1324) for hingedly connecting a lower edge of a side wall to the attachment means with one or more, preferably two, elongated connection systems (1313). Furthermore, the hinging openings of the attachment means are configured for sinking in essence perpendicular to the first shelft the lower edge of the side wall in the first shelf (FIGS. 9C and 9D;

FIGS. 10C and 10D). Preferably, the distance between the lower edge and the upper edge of a side wall are adapted telescopically when the lower edge of the side wall is sunk into the first shelf (FIGS. 9E and 9F; FIGS. 10E and 10F). Preferably, the attachment means comprises a locking system (1325, 1326) for avoiding the lifting of the sunk side wall out of the first shelf when telescopically adjusting the distance between the lower edge and the upper edge.

This is advantageous because in this preferred embodiment, the side walls can be kept upright in a stable way because the sunk part of a side wall is at least partially surrounded by the underlying (first) shelf. Thereby, the underlying (first) shelf can comprise tangent walls with the sunk part of the side wall preventing the hinging of the side wall. In order to collapse a pair of side walls towards each other again, they first must be taken out of the underlying (first) shelf.

In a preferred embodiment of the display, at least one of the shelves and the side walls comprises a metal or an alloy, preferably steel or aluminium.

This is advantageous because of several reasons. First of all, a metal or an alloy offers the possibility to make thin shelves with sufficient strength for the intended application. Secondly, the elements of which the side walls and/or the shelves are essentially made, can be easily manufactured out of a plate of a metal or an alloy by means of laser cutting, punching and folding of the plate. Thirdly, a metal or an alloy is a durable material, allowing the frequent and long-term use of a display according to this preferred embodiment. Fourthly, shelves and side walls from a metal or an alloy can be easily cleaned.

In a preferred embodiment, a shelf and/or a side wall comprises a synthetic material. Preferably a shelf, preferably each shelf, comprises a covering plate made of a synthetic material. As an alternative, a shelf, preferably each shelf, can be made of a synthetic material. Preferably, the synthetic material is polypropylene. More preferably, the synthetic material comprises glass fibre reinforced polypropylene. In a preferred embodiment, instructions for building up and/or collapsing a display are printed onto a synthetic part of a shelf.

This is advantageous because of several reasons. A synthetic material can easily be cleaned without losing its gloss. Moreover, a synthetic material weighs less than a metal or an alloy. Polypropylene (polypropene, PP) is well resistant to chemical solutions, bases and acids. A shelf/covering plate from polypropylene is thus well resistant to aggressive cleaning products. Furthermore, polypropylene is also well resistant to the growth of bacteria, and is therefore appropriate for displaying food.

In an embodiment of the display, each side wall (4a, 4b) comprises a pair of protruding hook elements (11) and each upper shelf one or more rail systems (22) which are appropriate for hooking each of the hook elements of each side wall of a pair of side walls in a slideable way.

In an alternative embodiment of the display, an upper (second) shelf comprises two or more sliding grooves (1321) for the sliding attachment of an upper edge of a side wall by means of one or more elongated connection elements (1322). Preferably, these sliding grooves are sliding recesses. Preferably, the sliding grooves are essentially straight. Preferably, an upper edge of a side wall can be slideably attached to a corresponding pair of sliding grooves by means of one elongated connection element.

This is advantageous because the sliding grooves determine the freedom of sliding movement of the upper edge of the side wall. Furthermore, an upper edge can easily be attached to the sliding grooves via the one or more elongated connection elements. Furthermore, the elongated connection element prevents loosening of a side wall of the upper (second) shelf.

In an embodiment of the display, the telescopic side walls comprise a first frame (4a), a second frame (4b) and an attachment system (10) with two attachment elements that can be moved with respect to each other. Hereby, the second frame can be extended with respect to the first frame. The frames are further configured to only move due to forces according to the telescopic direction. Thereto, the first frame can be slid at least partially into the second frame, or the second frame at least partially into the first frame. Thereto, the external frame comprises at least partially closed-off side walls or rails for at least partially surrounding the internal frame and for preventing movement of the internal frame with respect to the external frame in each movement direction perpendicular to the telescopic direction. The first frame further comprises two or more pairs of recesses. The attachment system is further appropriate for being attached to the second frame and for attaching the second frame with respect to the first frame by means of the positioning of the two attachment elements in a pair of recesses.

In a preferred embodiment one, and preferably each, telescopic side wall comprises:
 a frame (1307, 1311);
 one or more telescopic elements (1306) comprising recesses, the one or more telescopic elements being telescopic with respect to the frame; and
 an attachment system (1308, 1314) comprising two attachment elements that can be moved with respect to each other.

The attachment system is hereby configured for being applied to, and preferably in, the frame for attaching the frame with respect to the one or more telescopic elements by means of the positioning of the attachment elements in recesses of the one or more telescopic elements. Preferably, the telescopic elements and the frame are configured for preventing movements of the telescopic elements with respect to the frame perpendicular to the telescopic extension direction. Preferably, the attachment system can easily be moved manually relatively with respect to the frame, for taking out the attachment elements out of the recesses, so that the telescopic elements can be telescoped relatively with respect to the frame. One single operator can at least partially erect the side walls by lifting the upper (second) shelf, since the side walls automatically hinge and slide together with the lifting of the shelf. The same single operator can further also telescopically lengthen or shorten a pair of side walls.

Figure 2:
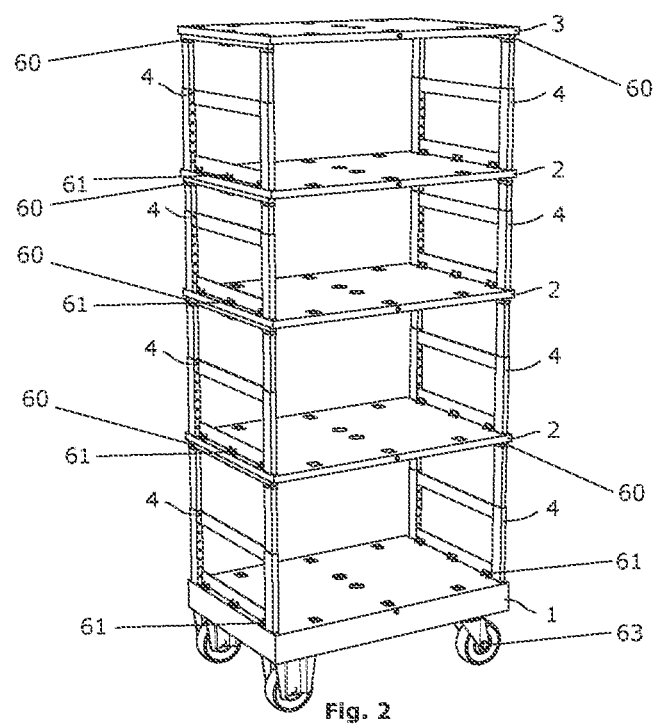
Figure 4A:
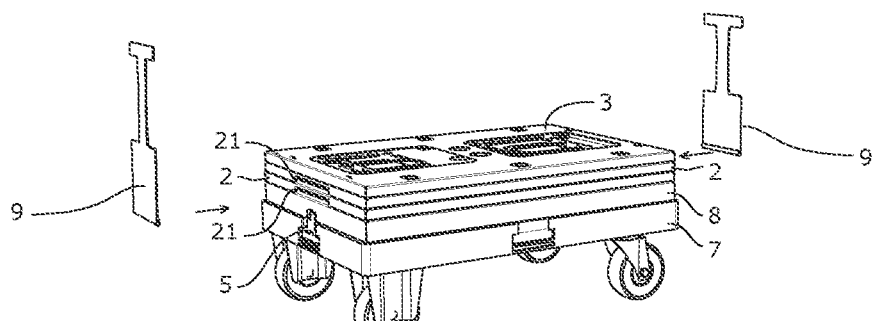
Figure 4B:
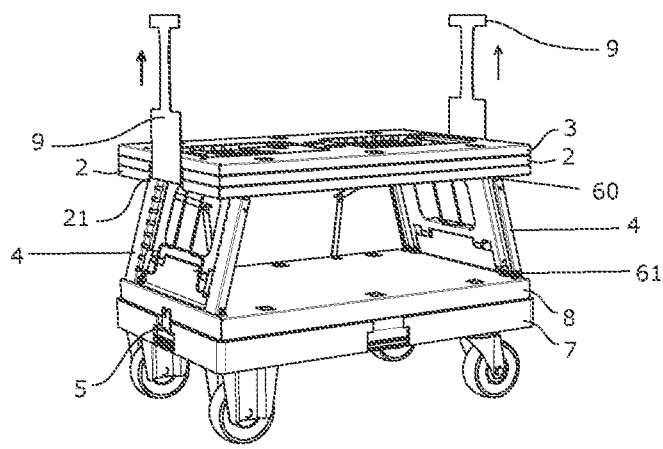
Figure 4C:
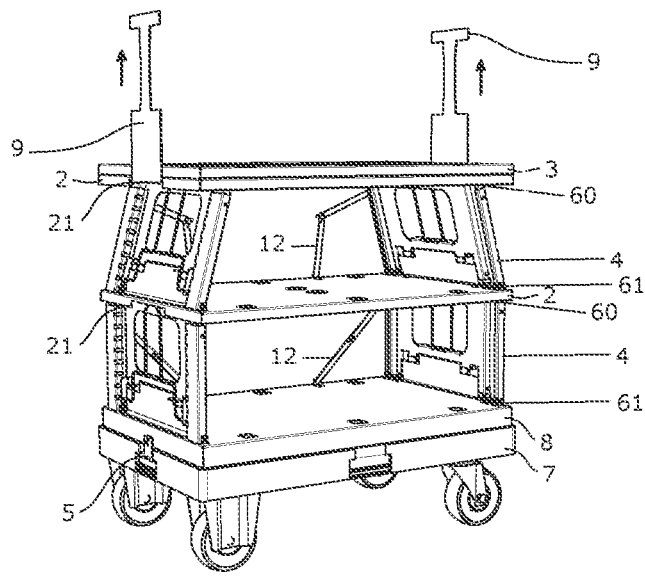
Figure 4D:
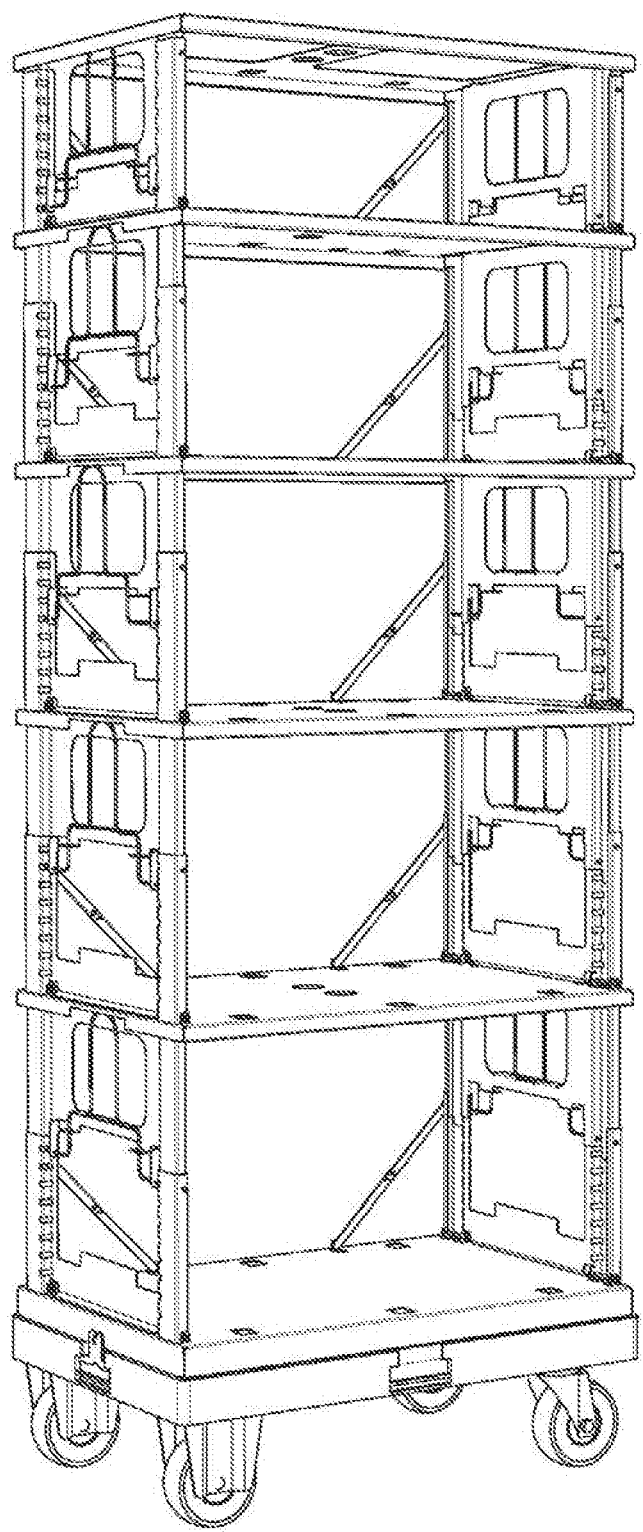

In a preferred embodiment of the display, the display further comprises at least three wheels. Preferably, the display comprises four wheels. Preferably, the display further comprises a rollable supporting frame comprising the at least three and preferably four wheels (63, 1390, 1391). One or more of the wheels can also comprise a braking system. FIG. 2 shows a schematic illustration of an embodiment of the display according to the present invention. The display comprises a supporting frame (1) with four wheels (63) for moving the display. Several shelves (2, 3) are spaced by means of pairs of hingedly connected (61), slideably attached (60), and telescopic side walls (4). The lower side of the lower shelf does not have to be configured with a rail system for slideably attaching side walls and the upper side of the upper shelf does not have to be configured for hingedly connecting side walls. The presence of wheels improves the ergonomics for an operator when moving the display, in a compacted and a build-up configuration. The braking systems can prevent the unintentional movement of the display, e.g. when displaying goods in a shop.

In a preferred embodiment, a shelf of the display comprises an edge for preventing that products fall out of the display. Preferably, the shelf and the edge do not only comprise a built-up configuration, but also a collapsed configuration, in which the edge does not protrude further than the upper side of the shelf. The edge in built-up configuration can comprise a horizontal profile that can be supported by means of vertical supports. The vertical supports can be foldable, to slide the vertical supports and the horizontal profile sideways into the shelf. Additionally or alternatively, once the housing has been applied to the display, a part of the housing of the kit can form an edge for preventing that goods fall out of the display.

In a preferred embodiment, a shelf of the display comprises a sliding mechanism for moving products on a shelf from the back side of the shelf to the front side. The sliding mechanism can be operated manually by an operator or it can be provided for moving the products in an automated way.

In an embodiment, a display, preferably the lower shelf, comprises recesses, holes and/or protrusions for connecting several displays to each other up to a row or an island of displays.

In a preferred embodiment, the display comprises a weighing sensor. The weighing sensor comprises a communication module and a weighing system on one or more shelves. The weighing system allows to determine the weight of the products on a particular shelf. In case of presence of essentially identical products and by knowledge of the weight of one single product, this allows to determine the number of products on a shelf. The weighing sensor is configured to send data continuously, at predetermined times, or when taking off a product via a communication module whereby the data are appropriate for monitoring the number of products on each shelf that is provided with a weighing system. Such weighing systems are well-known in the related field. An example has been described in US 2005/0086133.

The weighing sensor allows an automated inventory management. Furthermore, the weighing sensor allows to place orders for replenishing stocks based on the number of products that are currently present and/or the speed of product purchase, i.e. the number of products that are taken out of the display in a predefined time. Furthermore, the weighing sensor also allows a distributor to optimize the advertising budget according to the general purchase over a larger region, or product purchase in a particular commercial region.

In a preferred embodiment, the weighing sensor is a weighing plate that is appropriate for positioning onto or integration into a shelf of the display. The weighing plate comprises two plates and one or more force and/or distance sensors that are positioned between the two plates. Furthermore, the weighing plate can also comprise a spring-like material that is positioned between the two plates. Preferably, the two plates are made of plexiglass. An example of a force sensor is a force sensitive resistor (FSR). An example of a distance sensor is a capacitive sensor. Distance data of a distance sensor can be converted into a weight. This is possible e.g. by calculating by means of elastic characteristics of the spring-like material, or e.g. by calibration. Preferably, the weighing plate comprises the communication module which is also positioned between the two plates. The communication module of the weighing sensor is preferably a module for wireless communication, more preferably a Bluetooth low-energy chip (BLE chip). Preferably, the weighing plate comprises a battery, more preferably a coin cell or lithium-polymer accu. Most preferably, the communication module is configured for sending data in case of weight change. The weighing plate is advantageous because it comprises energy-saving provisions. Furthermore, preferably, all components are positioned between the two plates, and consequently the weighing plate can be easily handled and moved, and it is also robust for frequent use.

In an alternative embodiment, the weighing sensor is a textile comprising one or more pressure sensors. The textile can be adhered to a shelf of the display. Preferably, the textile is location-sensitive, more preferably with an accuracy of at most 10 cm, more preferably at most 8 cm, still more preferably at most 6 cm, even still more preferably at most 4 cm, such as an accuracy of 4 cm, 2 cm, 1 cm, 0.5 cm, 0.25 cm, or any value in between or lower. By means of this sensor, the taking off of a number of products and the corresponding location can be monitored. In this embodiment, based on the weight of a product and/or the supporting surface of a product, the number of products that are present on a shelf, as well as their location, can be monitored. Typically, products are taken from the front side. After taking off some products, the remaining products on the shelf can be located at the back side of the display, as a result of which they are more difficult to reach. Thereto, the display can be provided with a sliding mechanism for moving products from the back side of the shelf to the front side. Preferably, the textile comprises a module for wireless communication, more preferably based on Bluetooth technology. Preferably, several shelves of the display are provided with such a textile. An example of such a textile comprising a pressure sensor is the Physiosense sensor (Physiosense GmbH).

Additionally or alternatively, the display comprises a weighing sensor at a wheel of the display. Preferably, the display comprises a weighing sensor at each of the wheels of the display. This weighing sensor allows to monitor the taking-off of products of the whole display. This is advantageous when the display comprises one single type of products with essentially the same weight (e.g. essentially identical bottles of ketchup), or when the taking-off of diverse types of products based on weight differences of the diverse types of products (e.g. bottles of ketchup on the one side and jars of mayonnaise on the other hand) can clearly be distinguished.

Additionally or alternatively, the display comprises at least one of a temperature sensor, a location sensor, a gas sensor and a humidity sensor. A location sensor can be based on BLE, NFC, Wi-Fi or GPS. Each of the temperature sensor, gas sensor and humidity sensor is advantageous for monitoring the environmental conditions for products that can expire. Examples of products that can expire, are fruit, vegetables and plants. Preferably, the gas sensor is an electrochemical gas sensor. An example of a gas sensor is an ethylene sensor. A gas sensor can further be advantageous for monitoring leaks of dangerous products.

In a preferred embodiment, the display further comprises a detection system for monitoring the attention of a consumer. The detection system can thereby comprise one or more of the following devices: an infrared sensor, an eye detection system, a camera, a Wi-Fi tracker, and a Bluetooth low-energy beacon (e.g. an iBaecon). These apparatuses can be configured for monitoring the distance and the position of consumers with respect to the display, the field of vision of consumers, the period that consumers spend in front of the display, and the age, the sex, the ethnicity and the facial expressions of consumers. Such apparatuses are well-known in the related field. Examples have been described in US 2013/0117053.

The detection system allows to determine and analyse the consumer attitude. Based on this information, the positioning of the display in the shop, the positioning of products on the different shelves of the display, as well as the advertisement wall of the kit according to the present invention can be optimized.

In a preferred embodiment, the display comprises a promotion chip for sending promotion data to and/or receiving recognition data from a user device of a client via a wireless communication. An example of a user device is a smart phone. Preferably, the promotion data are client-specific. The client can e.g. have an account at a shop that is linked to his or her user device. The user device can e.g. comprise an application for showing a loyalty card on a screen of the user device, for on-line shopping, and the like. The promotion chip can recognize the client by means of the user device, and can be configured for showing client-specific promotion data on the screen of the user device. Preferably, the promotion chip is an RFID chip.

Furthermore, the display can comprise one or more electronic price indications. Hereby, an electronic price indication can comprise a screen, a battery and a module for wireless communication. Data relating to a new price that must be shown on the screen of the electronic price indication can then be received via the module for wireless communication. Such electronic price indications are well-known in the related field. Examples have been described in U.S. Pat. No. 6,570,492.

In a preferred embodiment, the display comprises a communication module and at least one of a weight sensor, a temperature sensor, a location sensor, a gas sensor, a humidity sensor, an infrared sensor, an eye detection system, a camera, a Wi-Fi tracker, a Bluetooth low-energy beacon, an RFID promotion chip, and an electronic price indication. Hereby, said communication module can send data relating to several sensors, systems and the like. Alternatively, a communication module can be provided for each sensor, system and the like.

In a preferred embodiment, the display further comprises a cooling installation. When positioning the housing of the kit according to the second aspect of the current invention, the cooling installation is appropriate for cooling products on the shelves up to a predetermined maximum temperature. Such cooling installations are well-known in the related field. An example has been given in U.S. Pat. No. 6,360,548.

In a preferred embodiment, the display comprises a cooling installation, at least one temperature sensor, and a feedback loop for controlling the cooling installation based on the measurements with the at least one temperature sensor. Alternatively or additionally, the display can comprise at least one temperature sensor and a warning system for warning when a measured temperature falls out of a predefined interval. The warning system can generate an auditive or visual warning on the display and alternatively or additionally, generate an auditive or visual warning on a user device (such as e.g. a smart phone, desktop, . . . ) that has been coupled communicatively to the display. Products that have been cooled appropriately require less conservatives. Furthermore, the appropriate cooling ensures that the products effectively reach their expiry date. In this way, less products have to be thrown away unnecessarily.

In an embodiment, the display can be provided with an electronic cooling installation at the lower side or at the upper side of the display. Preferably, the shelves are thereby provided with openings and/or screens for air flow by means of forced convection. Alternatively, the display can be provided with dry ice, comprising carbon dioxide in its solid form. Preferably, the dry ice is positioned at the upper side of the display. The air in the vicinity of the dry ice is cooled. The density of the cooled air ensures that it migrates down through openings and/or screens of the shelves as a result of natural convention so that the cooled air can reach each shelf. The solution with dry ice is advantageous because no current or battery must be provided, which can be advantageous for outdoor locations such as e.g. festivals, city centres, . . . .

In a preferred embodiment, one or more aspects of the present inventions are commercialized under the brand name of Proteus.

FIG. 3 shows a schematic illustration of a method for building up an embodiment of a display according to the present invention. In FIG. 3A, a display is shown comprising a moveable supporting frame (1) in a compact configuration. By exerting an upward force on the last but one lowest shelf, the side walls between the last but one lowest shelf and the lowest shelf are erected. Thereby, the side walls (4) hinge at the hinging connection (61) at the lower edge with the lowest shelf and the side walls (4) at the upper edge slide along the last but one lowest shelf (FIGS. 3B and 3C). Once the side walls (4) have been erected, they can be extended telescopically by means of an appropriate further upward force (FIGS. 3E and 3F). In an embodiment, the two attachments of the attachment system thereto first must be pushed towards each other so that they are removed out of the pair of recesses so that the two frames can be moved telescopically with respect to each other. By placing the attachments in another pair of recesses, both frames are again attached with respect to each other. After erecting and possibly extending or shortening the lower side walls, other pairs of side walls can be erected and possibly be extended or shortened (FIGS. 3G to 3M). The length of the different pairs of telescopically extendible side walls can be chosen differently for each pair. One can also opt to not space two oppositely positioned shelves, and thus to obtain a display with less shelves.

In an embodiment of the present invention, the present invention relates to:

1. A display for displaying goods, the display comprising:
  a lower shelf, an upper shelf and zero, one or more intermediate shelves, the lower shelf, the upper shelf and each of the intermediate shelves comprising an upper side and a lower side; and
  one or more pairs of side walls for supporting an intermediate shelf or the upper shelf, each of the side walls comprising a lower edge and an upper edge, the number of pairs of side walls preferably being equal to one more than the number of intermediate shelves,
  characterised in that
  the upper side of each intermediate shelf and of the lower shelf is configured for hingedly connecting both lower edges of a pair of side walls;
  the lower side of each intermediate shelf and of the upper shelf is configured for slideably attaching both upper edges of a pair of side walls; and
  each of the side walls is arranged telescopically for setting at least two different distances between the lower edge and the upper edge, in which a pair of side walls that are hingedly connected to a first shelf and that are slideably attached to a second shelf comprise a supporting configuration, in which the side walls are essentially parallel to each other and perpendicular to both shelves, in which the pair of side walls can be collapsed towards each other from the supporting configuration.

2. A display according to preceding description 1, in which:
  the upper side of each intermediate shelf and of the lower shelf comprises a pair of attachment means, each attachment means comprising two or more essentially aligned attachment holes, preferably each attachment means comprising four attachment holes; and
  the lower edge of each side wall comprises two or more essentially aligned hinging holes, preferably four hinging holes, in which the hinging holes of a side wall and the attachment holes of an attachment means are appropriate for hinging the side wall to the attachment means by applying one or more cylindrical connection systems, preferably two connection systems, through one or more attachment holes and through one or more hinging holes, preferably each connection system being applied through two attachment holes and two hinging holes.

3. A display according to any one of the preceding descriptions 1 and 2, in which the upper edge of each side wall comprises a pair of protruding hook elements, and in which the lower side of each intermediate shelf and of the upper shelf comprises one or more rail systems that are appropriate for hooking each of the hook elements of each side wall of a pair of side walls in a sliding way.

4. A display according to any one of the preceding descriptions 1 to 3, in which each of the telescopic side walls comprises a first frame, a second frame and an attachment system with two attachment elements that can be moved with respect to each other, the second frame being extendible with respect to the first frame, the first frame comprising two or more pairs of recesses, the attachment system being appropriate for being applied to the second frame and for attaching the second frame with respect to the first frame by means of the positioning of two attachment elements in a pair of recesses.

5. A display according to any one of the preceding descriptions 1 to 4, the display comprising for each side wall a positioning element, the positioning element being appropriate for supporting a hinged side wall in a supporting configuration, the positioning element comprising a first and a second elongated rigid supporting element, the first supporting element comprising a first hinging point for attachment to the shelf to which the hinged side wall has been attached, the second supporting element comprising a second hinging point for attachment to the side wall, and the second supporting element comprising a third hinging point where the supporting elements are hinged to each other for collapsing the side walls in a supporting position towards each other.

6. A display according to any one of the preceding descriptions 1 to 5, the display comprising a rollable supporting frame, the supporting frame comprising at least three wheels, preferably four wheels, the supporting frame and the lower shelf being arranged for attachment of the lower shelf to the supporting frame on wheels.

7. A display according to any of the preceding descriptions 1 to 6, in which the lower shelf, the upper shelf, and the intermediate shelves each comprise an essentially rectangular upper side, the rectangular upper sides comprising an in essence same length dimension and in essence same width dimension, the dimensions being appropriate for covering at least 90%, preferably at least 95%, and more preferably at least 98% of the support surface of a Chep pallet with a total number of non-overlapping rectangles with the same length and width dimension.

8. A display according to any one of the preceding descriptions 1 to 7, the lower shelf, the upper shelf, the intermediate shelves, and the side walls comprising a metal or an alloy, preferably comprising steel or aluminium, more preferably essentially made of galvanized steel with a thickness of about 0.8 mm or of aluminium with a thickness of about 1.2 mm.

9. A display according to any one of the preceding descriptions 1 to 8, the display comprising a sensor, the sensor comprising a communication module and a weighing system on at least one of the intermediate shelves and/or on the lower shelf, the sensor being configured for sending data that are appropriate for monitoring the number of products on each shelf provided with a weighing system.

10. A display according to preceding description 9, in which the sensor further comprises a detection system for monitoring the attention of consumers, the detection system comprising one or more of the following devices: an infrared sensor, an eye detection system, a camera, a Wi-Fi tracker, a Bluetooth low-energy beacon, in which one or more of the apparatus are appropriate for monitoring the distance and the position of consumers with respect to the display, the field of vision of consumers, the time consumers spend in front of the display, and the age, the sex, the ethnicity and the facial expression of consumers.

11. A display according to any one of the preceding descriptions 1 to 10, the display comprising a cooling installation.

12. A kit comprising a display according to any one of the preceding descriptions 1 to 11 and a housing for the display, the display comprising an intended configuration, the kit being arranged for attaching the housing to the display in the intended configuration, the housing comprising an advertisement wall, the advertisement wall being appropriate for at least partially covering the shelves and/or the side walls of the display in the intended configuration, the advertisement wall of the attached housing further being appropriate for taking products on the upper sides of at least one of the shelves.

13. A method for spacing a first and a second shelf for displaying consumer goods, the first and the second shelf comprising an upper surface and a lower surface, the method comprising the steps:

providing two side walls for supporting the second shelf onto the first shelf in a spaced way, the second shelf being positioned on the first shelf, the side walls being positioned between the first and the second shelf, the side walls being substantially parallel to both shelves, each of the side walls comprising a first contact edge and a second contact edge;

exerting an upward force onto the first shelf and thereby, for at least one of the side walls:

a. sliding the first contact edge in an essentially parallel way to a surface of one of both shelves; and/or b. rotating the side wall around a rotation axis, in which the rotation axis is essentially coaxial to the second contact edge and is essentially located at a surface of one of both shelves; and/or c. changing the distance between the first and the second contact edge.

14. A method according to the preceding description 13, in which the sliding (step a.) and the rotating (step b.) are realized simultaneously and for both side walls at the same time till both side walls are positioned essentially perpendicular to both shelves, after which the changing of the distance between the first and the second contact edge (step c.) is realized simultaneously for both side walls.

15. A method according to the preceding description 14 for spacing two shelves of a display of any one of the preceding descriptions 1 to 11.

In the following, the invention will be described by means of non-limiting examples illustrating the invention, and not meant to be interpreted as limiting the scope of the invention.

Example 1

FIG. 4 shows a schematic illustration of a preferred embodiment of a display and a method for the build-up thereof. In FIG. 4A, the display is shown in a compact configuration. The display comprises a supporting frame (7) on wheels, to which a lower shelf (8) is attached by means of a screwed hook element (5). The display further comprises two intermediate shelves (2), and an upper shelf (3). The intermediate shelves (2) are provided with recesses (21) for easily grasping an intermediate shelf (2) with a pair of grippers (9). By means of an upward force that is exerted onto the grippers (9), the lower side walls (4) can first be put upright and consequently be extended telescopically. When erecting (FIG. 4B), the side walls (4) hinge at the hingeable connection (61) of the lower edge. When erecting (FIG. 4B), the side walls (4) also slide at the lower side of the upper intermediate shelf (2). A positioning element (12) is also clapped open for supporting the side walls (4) and for preventing folding-over of the side walls. After erecting the lower pair of side walls, the following pair can be erected (FIG. 4C).

Example 2

Figure 5:
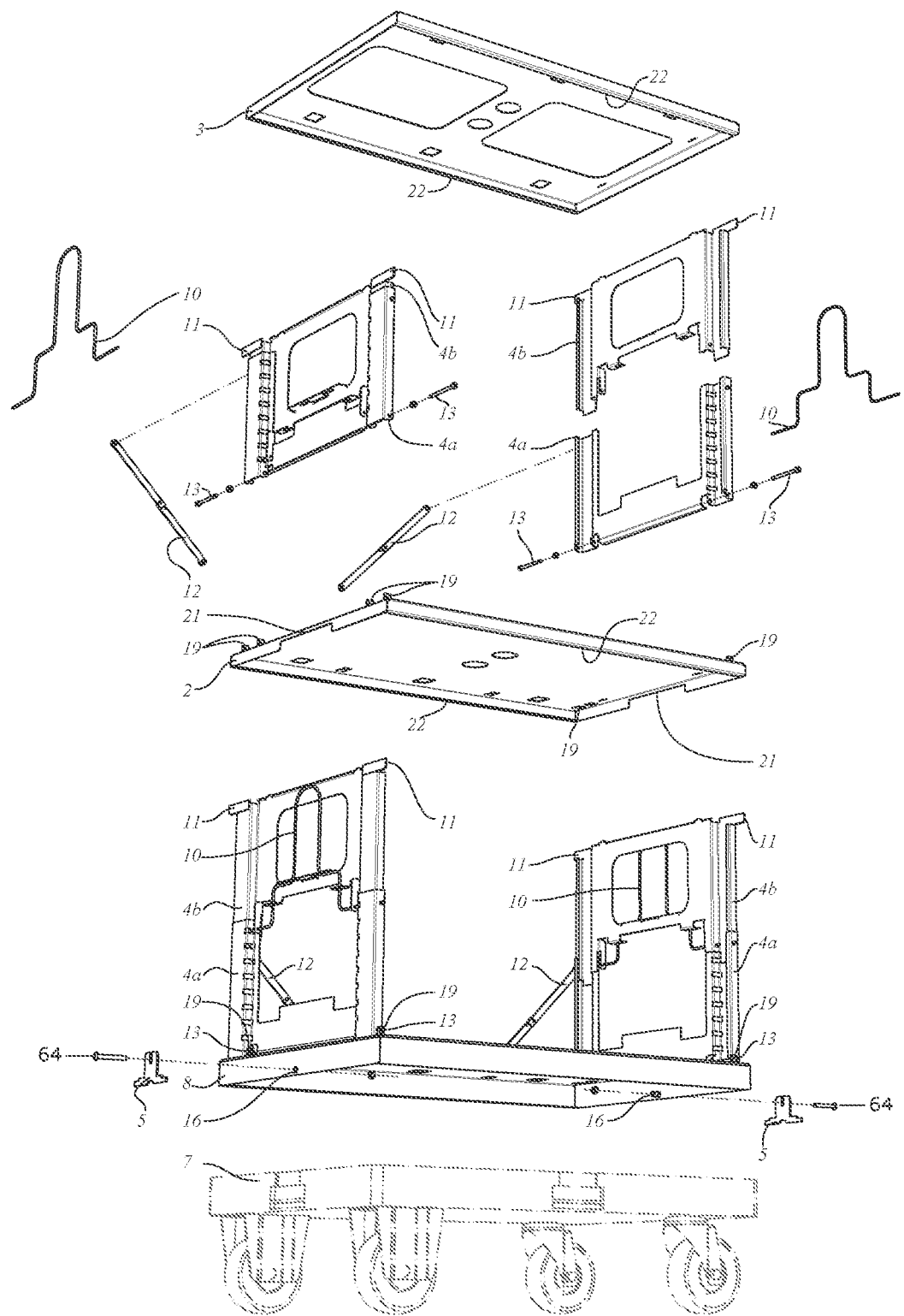
FIG. 5 is a detailed illustration of different components of a first embodiment of a display according to the present invention.
Figure 6A:
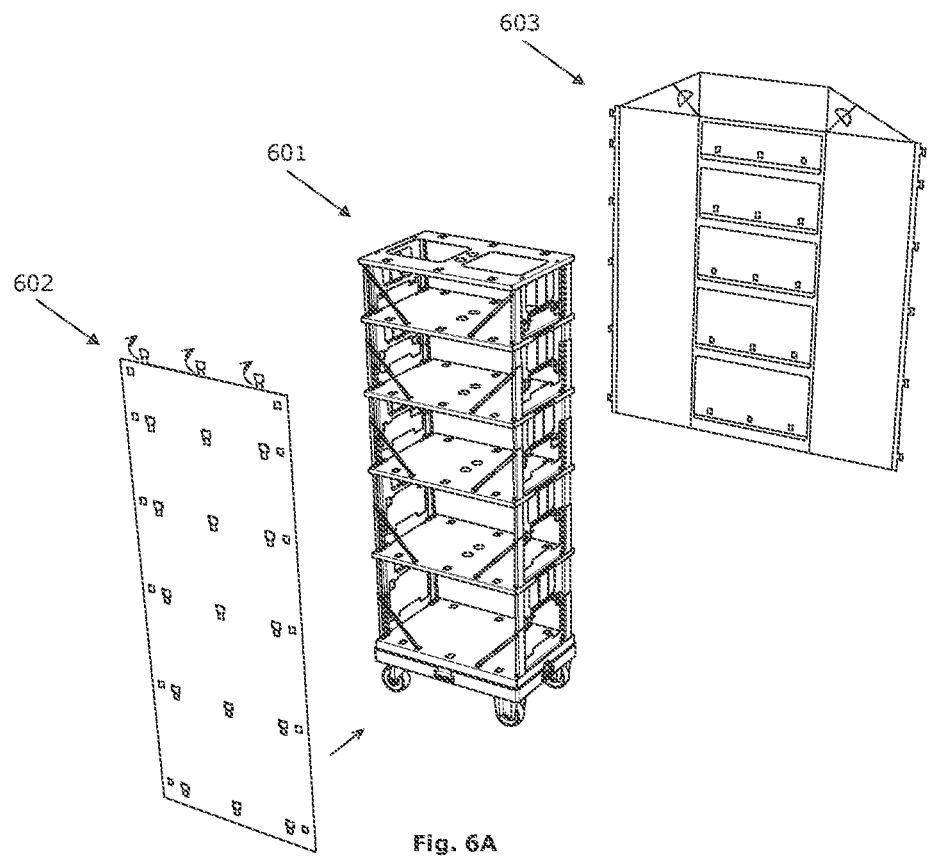
FIGS. 6A-6E and 14A-14E are schematic illustrations of embodiments of a kit according to the present invention, comprising a display and a housing.
Figure 6B:
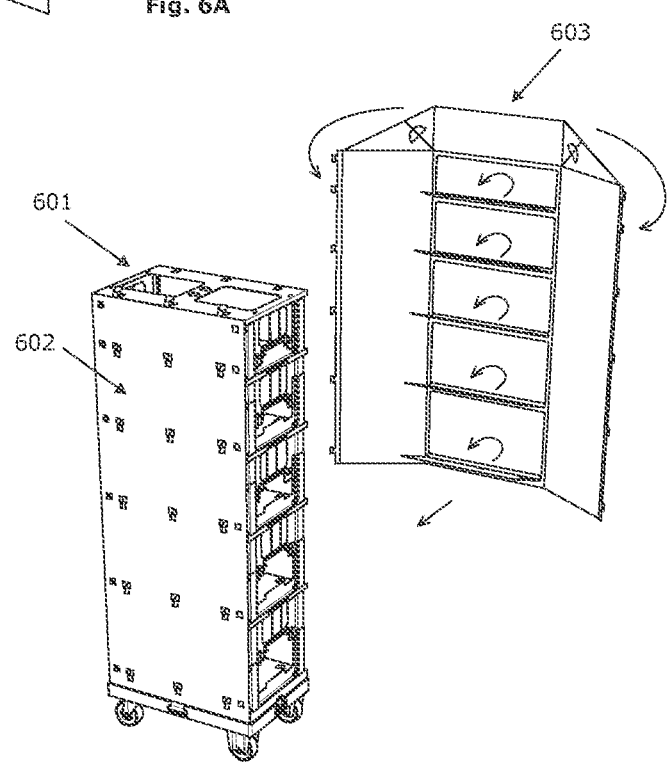
Figure 6C:
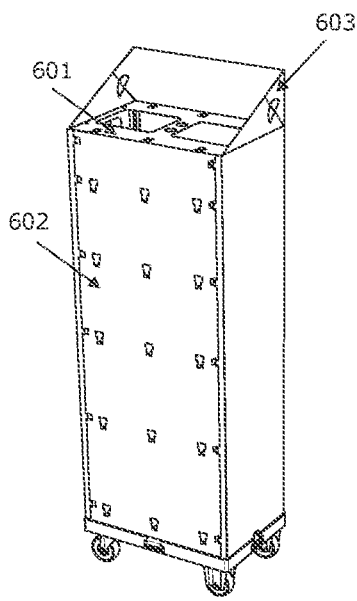
Figure 6D:
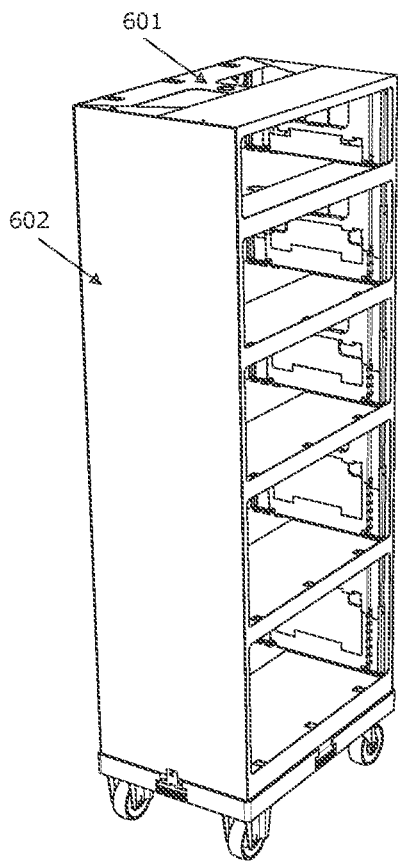
Figure 6E:
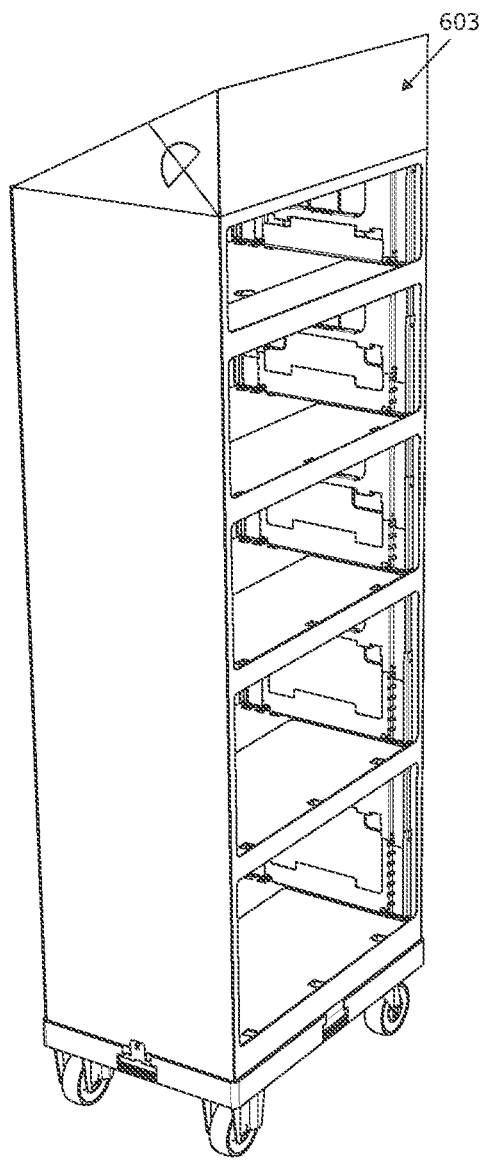

FIG. 5 shows a schematic detailed illustration of different components of the display of the first example. The supporting frame (7) with four wheels is appropriate for attaching the lower shelf (8). Thereto, a pair of hook elements (5) are hooked in the recesses of the supporting frame provided thereto and consequently screwed by means of screws or bolts (64) in the holes (16) in the lower shelf (8) provided thereto. Furthermore, the lower shelf (8), as well as the intermediate shelves (2), comprise two attachment elements. One attachment element comprises four aligned holes (19) at the upper side of the respective shelf. Furthermore, the side walls comprise a first frame (4a) and a second frame (4b). The second frame (4b) can be extended telescopically with respect to the first frame (4a). Furthermore, the side wall also comprises an attachment system (10) that can be attached to the second frame. The attachment system comprises a pair of attachment elements that can be moved towards each other for attaching the second frame (4b) with respect to the first frame (4a) by moving the attachment elements in a pair of recesses in the first frame (4a). The first frame (4a) comprises hinging holes for hinging the first frame to the attachment holes of the lower shelf (8) or an intermediate shelf (2) by means of two bolts (13) and nuts. The second frame (4b) further comprises a pair of hook elements (11) for attaching the second frame (4b) to a rail system (22) at the lower side of an intermediate shelf (2) or an upper shelf (3) in a sliding way. Furthermore, the display also comprises for each side wall a positioning element (12) comprising two rigid supporting elements. One of both supporting elements is hingedly connected to the shelf to which the side wall is hingedly connected. The other supporting element is hingedly connected to the side wall itself.

The two supporting elements are further also hingedly connected to each other. The positioning element (12) serves for supporting the side walls and for preventing that the side walls fold over.

Example 3

FIG. 6 shows a schematic illustration of a preferred embodiment of the kit according to the second aspect of the present invention. The display (601) of the kit comprises an intended configuration. The intended configuration comprises which pairs of side walls must be put upright, and for each pair of side walls that have been put upright, the distance between the upper edge and the lower edge of the side walls. This distance can e.g. be shown by indication of the pair of recesses in which the attachment elements of the attachment system are placed. In the display (601) in FIG. 6, all positioning elements are positioned at one and the same side of the display, the back plane. At the back plane, a back panel (602) is placed, for preventing that products fall out of the display at the back side and/or for showing visual elements for attracting the consumers to the display. Furthermore, the kit also comprises an advertisement wall (603) for at least partially covering the shelves and/or the side walls of the display in the intended configuration. The advertisement wall (603) and the back wall (602) are part of the housing of the kit. In FIG. 6B, the back panel (602) is attached to the display and the advertisement wall, preferably made of cardboard, and preferably provided with incisions and preformed folds, is folded to a front panel and two side walls for the display in the intended configuration. When mounting onto the display (601), a part of the advertisement wall (602) is placed on the shelves. The advertisement wall can be provided with visual elements for attracting consumers to the display.

In an embodiment, the housing (602, 603) comprises cardboard. In an alternative preferred embodiment, the housing comprises a synthetic material, more preferably expanded polystyrene, such as e.g. Archi-foam.

Example 4

Figure 7:
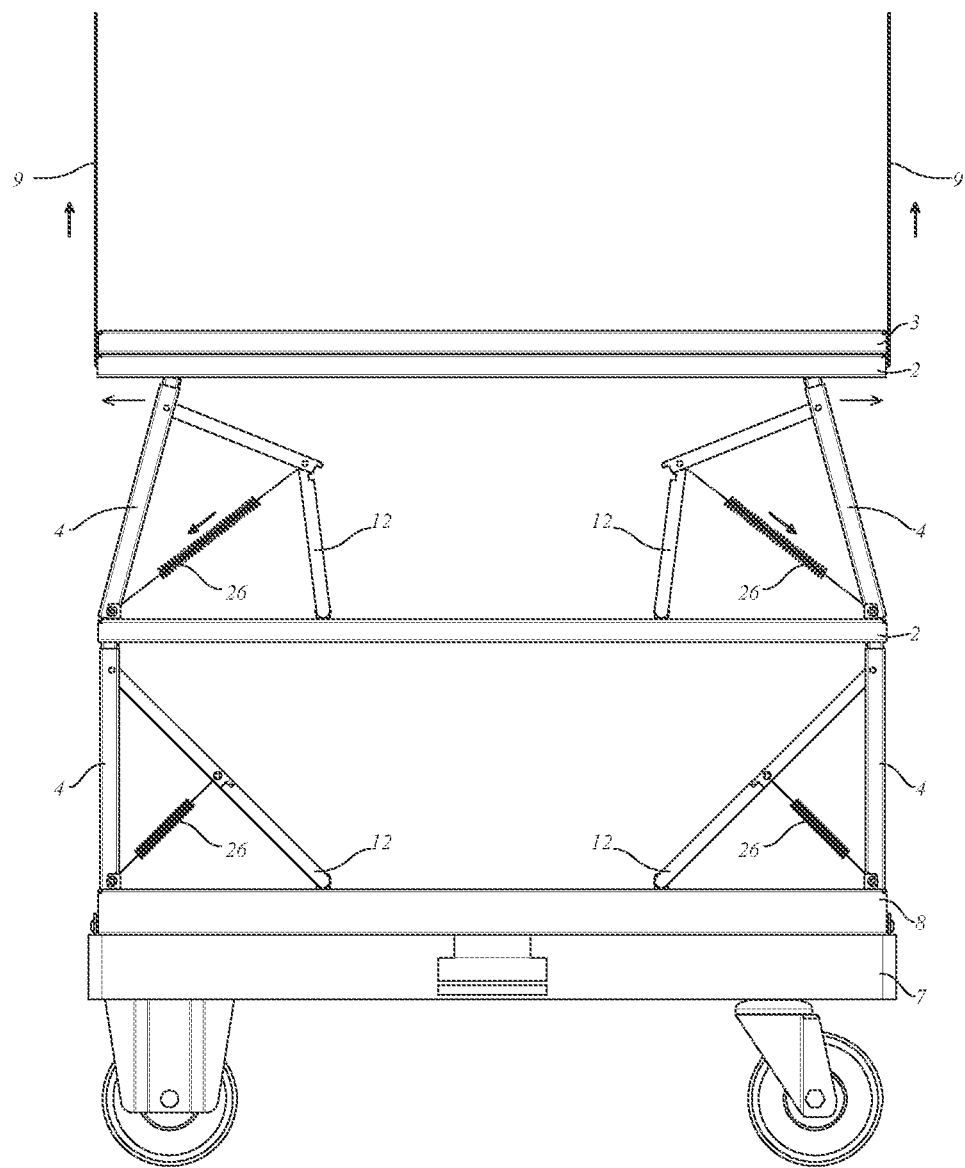

FIG. 7 shows another preferred embodiment of the display. The positioning element (12, 26) further comprises in FIG. 7 a spring system (26). The spring element (26) is thereby attached to the third hinging point of the supporting elements (12) and to a cylindrical connection system for hinged connection to the side wall (4). The spring system (26) helps to put the side walls (4) upright. When rotating a side wall (4) around its hinging axis, just before the perpendicular positioning of the side wall onto the shelf to which it has been hingedly connected, the intended movement direction of the upper edge of the side wall is indeed almost perpendicular to the direction of the upward force. As a result, it is difficult to put the side wall (4) completely upright by means the upward force. A spring system (26) offers a solution for this problem.

Example 5

Figure 8A:
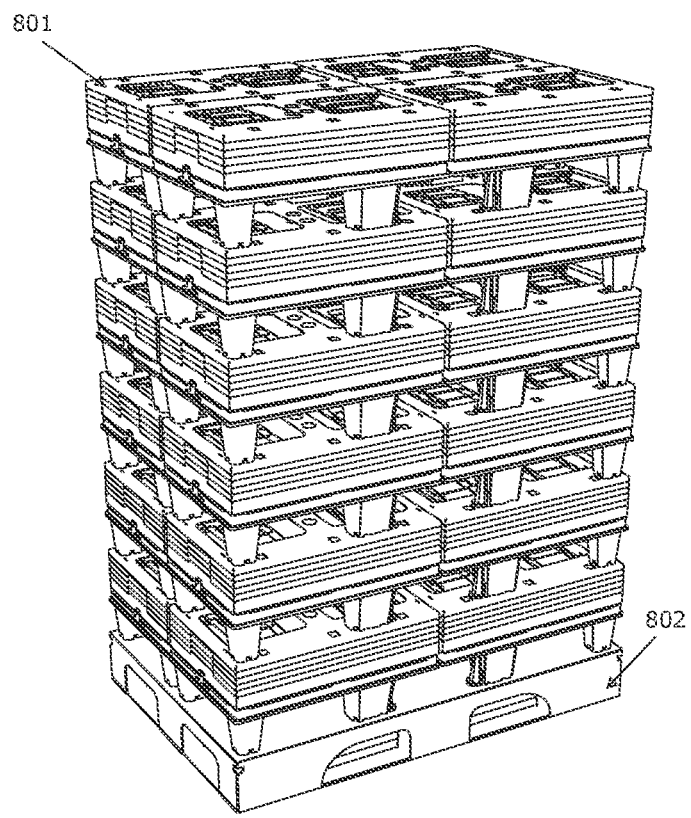
FIGS. 8A-8C and 17A-17B are schematic illustrations of compact methods of transport of several displays according to the present invention.
Figure 8B:
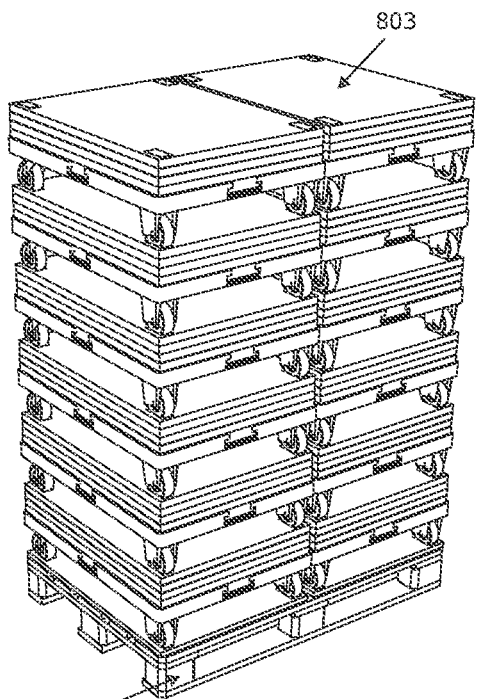
Figure 8C:
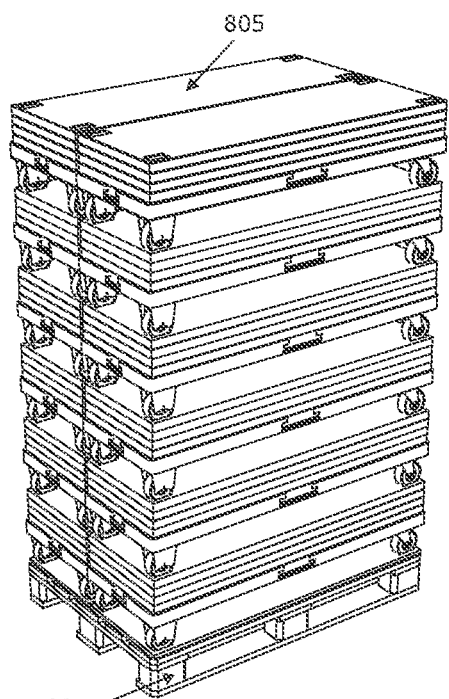

FIG. 8 shows different preferred sizes and preferred piles on a Chep pallet (802, 804) of displays (801, 803, 805) according to the present invention. Hereby, the displays are in a compact configuration, i.e. all side walls of the display are positioned essentially parallel to the shelves of the display. The shelves of the display and the supporting frame are essentially rectangular. The dimensions of the shelves define a rectangle. The rectangle is appropriate for covering at least 90%, preferably 95%, more preferably 98% of the surface of the Chep pallet. Hereby, the rectangle defined by the shelves of the display can in essence be congruent to the surface of the pallet (FIG. 8A). Hereby, the rectangle defined by the shelves of the display can also not be congruent to the surface of the pallet (FIG. 8C). In FIG. 8A, four displays (801) fit per height level on the pallet (802). In FIGS. 8B and 8C, two displays (803, 805) fit per height level on the pallet (804). Furthermore, the supporting frames and/or upper shelves of the displays can be configured for preventing sliding off of different stacked displays in the compact configuration. In FIGS. 8B and 8C, the wheels of a display are sunk e.g. in the upper shelf of the underlying display. In the piles of FIGS. 8B and 8C, a shelf is also provided on the surface of the Chep pallet for sinking the wheels of the displays on the lower height level.

Example 6

FIG. 9 shows a schematic illustration of a working principle according to the present invention. FIG. 10 shows a detailed illustration of a preferred embodiment according to the present invention. The alphabetic numbering of the partial figures of FIGS. 9 and 10 correspond.

The display comprises a first shelf (101), a second shelf (102), and two telescopic side walls (103) each hingedly connected (105) at a lower edge to the first shelf (101) and slideably attached (104) at an upper edge to the second shelf (102).

Initially (FIGS. 9A and 10A), the second shelf (102) is positioned onto the first shelf (101). The telescopic side walls (103) are hereby positioned between the first shelf (101) and the second shelf (102), and are substantially parallel to both shelves. By exercising an upward force (FIGS. 9B and 10B) onto the second shelf (102), the side walls (103) are automatically at least partially pulled upright. Hereby, the upper edges of the side walls (103) slide outward along the lower side of the second shelf (102) by means of the sliding attachment (104). At the same time, the side walls (103) hinge open around a rotation axis that is essentially coaxial to the lower edge. The angle α between the side walls (103) and the first shelf (101) hereby increases. The side walls can be brought into a vertical position, in which said angle α is about equal to 90°. FIGS. 9C and 10C show the first shelf (101), the second shelf (102) and the side walls (103) in a supporting configuration. In the supporting configuration, the side walls (103) are essentially perpendicular to both shelves (101, 102). Furthermore, the pair of side walls can be collapsed towards each other from the supporting configuration. A part of the side walls (103) can be sunk from the supporting configuration into the first shelf (101) (FIGS. 9C and 10C). Hinging of the partially sunk side walls (103) is prevented because the sunk parts are surrounded by the first shelf (101). To collapse the side walls (103) towards each other, they first have to be taken out of the first shelf (101) again, before the desired rotation can be carried out. The first shelf (101) is provided with a locking system for avoiding that a sunk side wall is taken out of the first shelf. Once the side walls (103) have been sunk and locked (FIGS. 9D and 10D), the height of the side walls (103) can be adapted telescopically (FIGS. 9F and 10F). Said operations can be carried out manually or in a machine-executed way.

Figure 11:
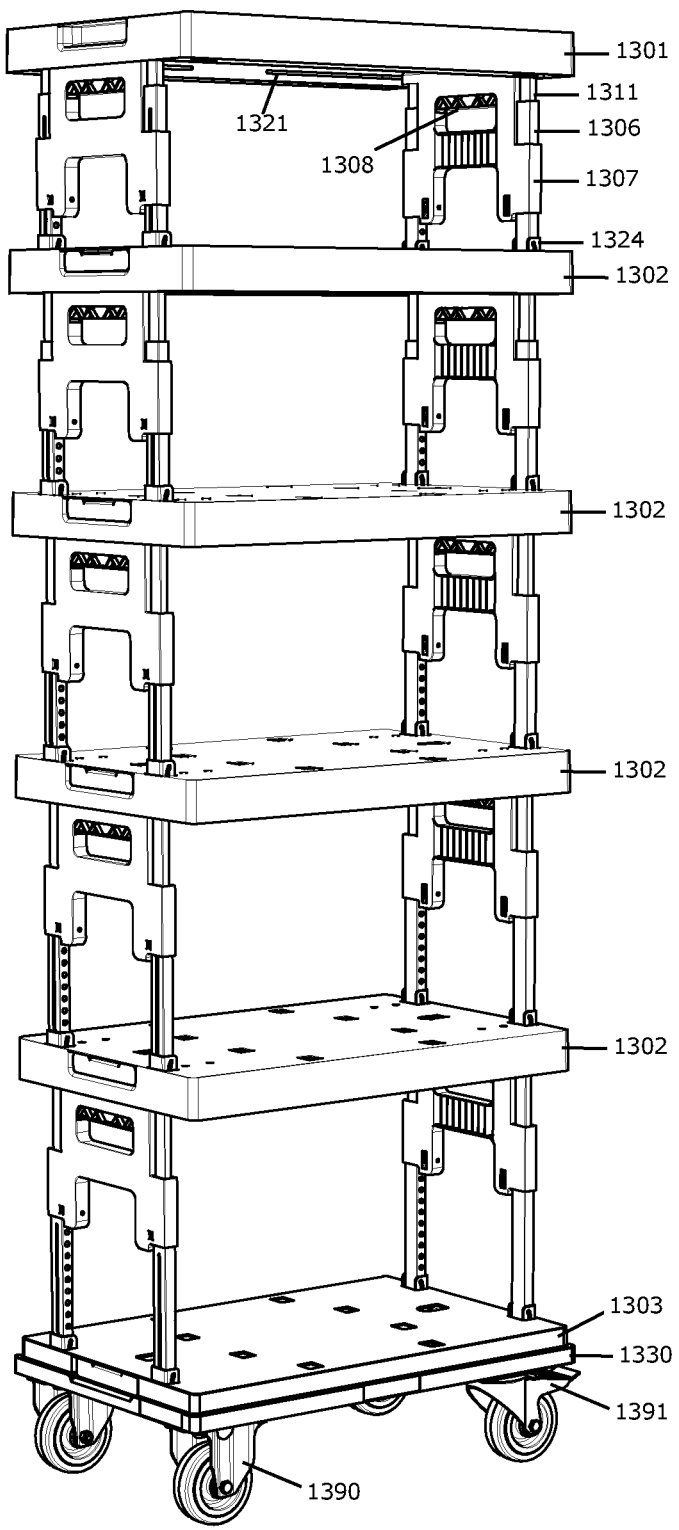
FIGS. 11 and 13 are detailed illustrations of different components of a second embodiment of a display according to the present invention.
Figure 12:
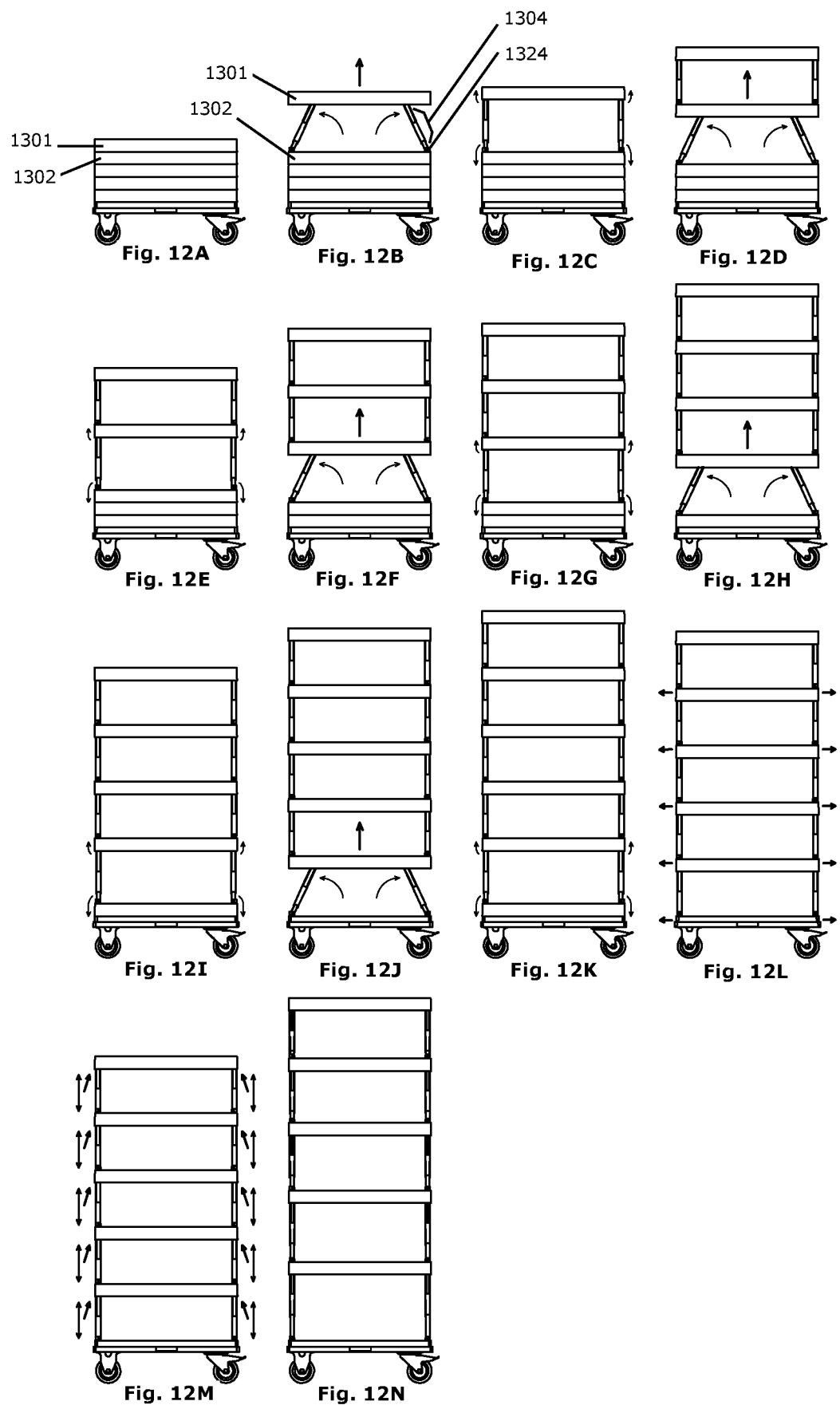
Figure 13:
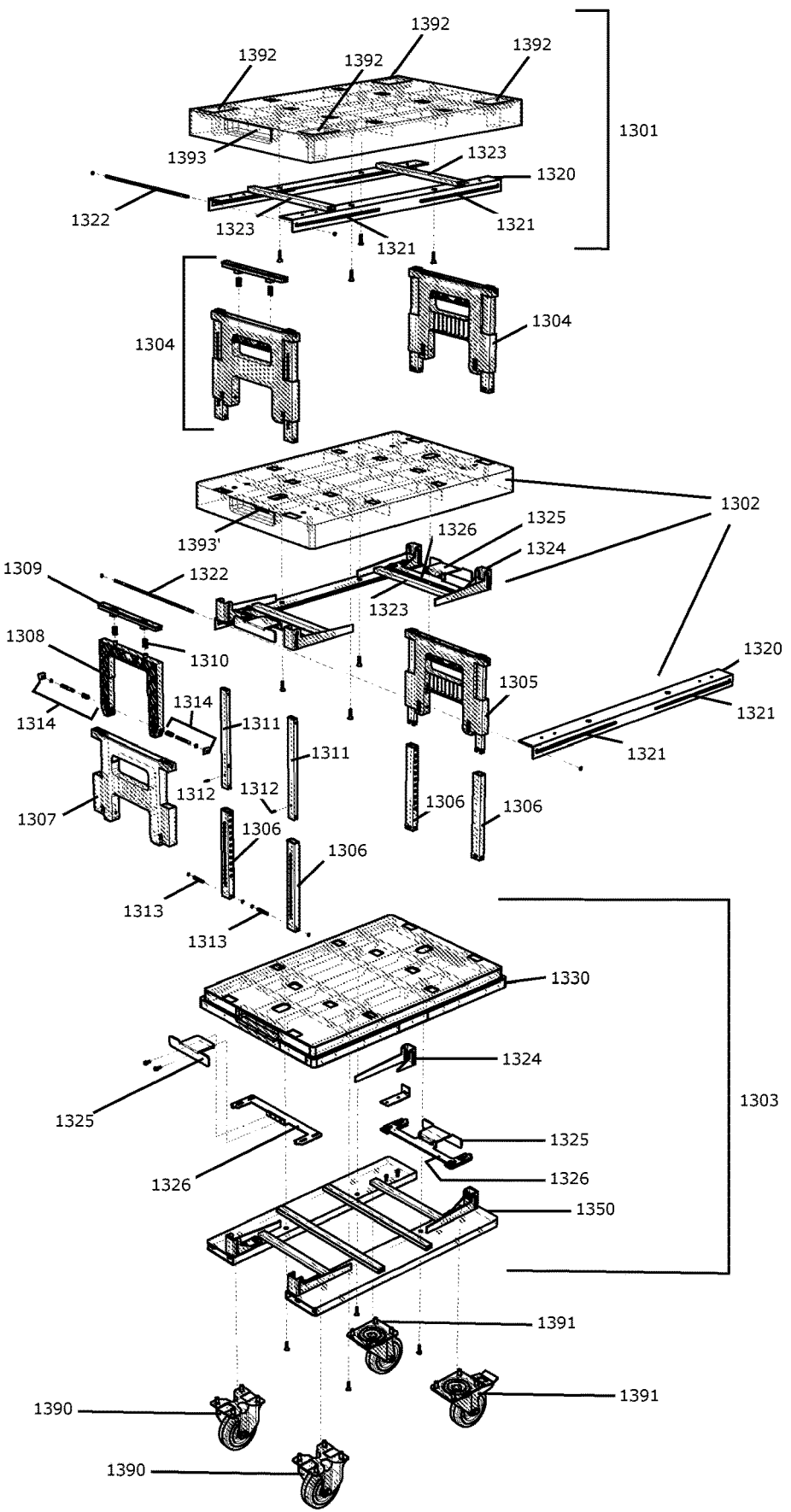
Figure 14A:
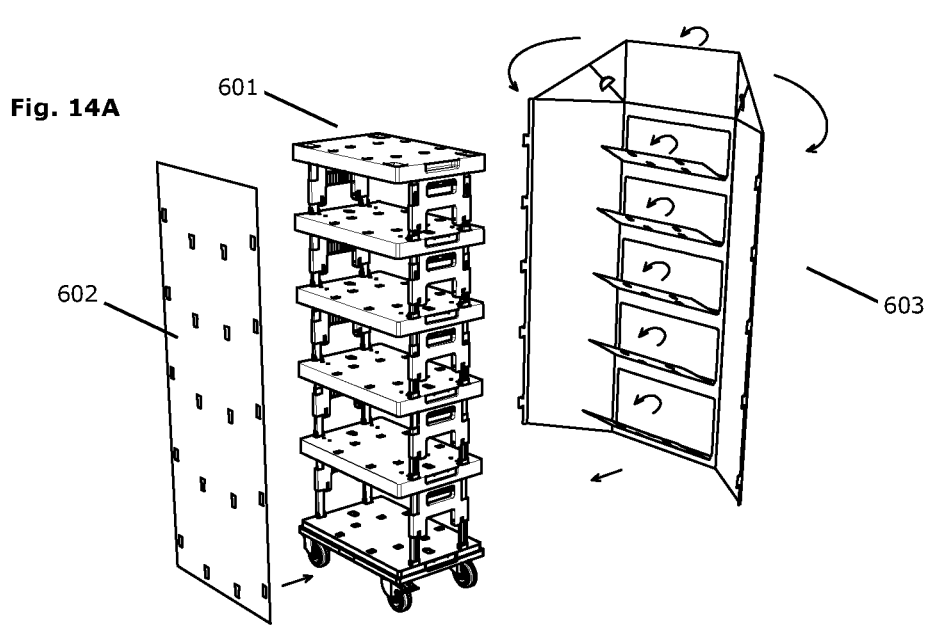
Figure 14B:
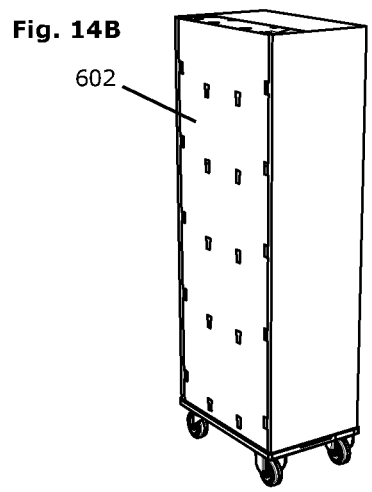
Figure 14C:
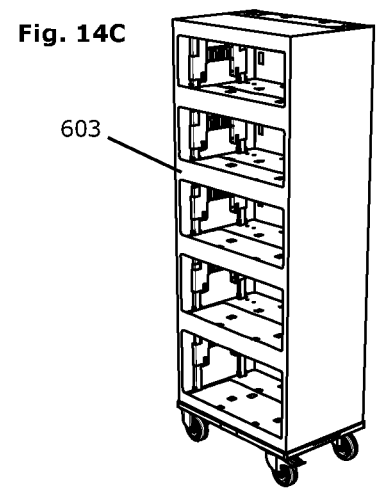
Figure 14D:
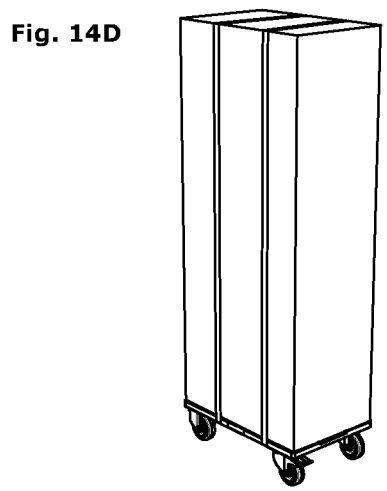
Figure 14E:
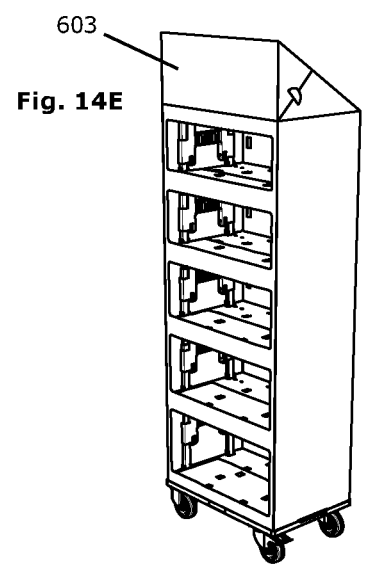
Figure 15A:
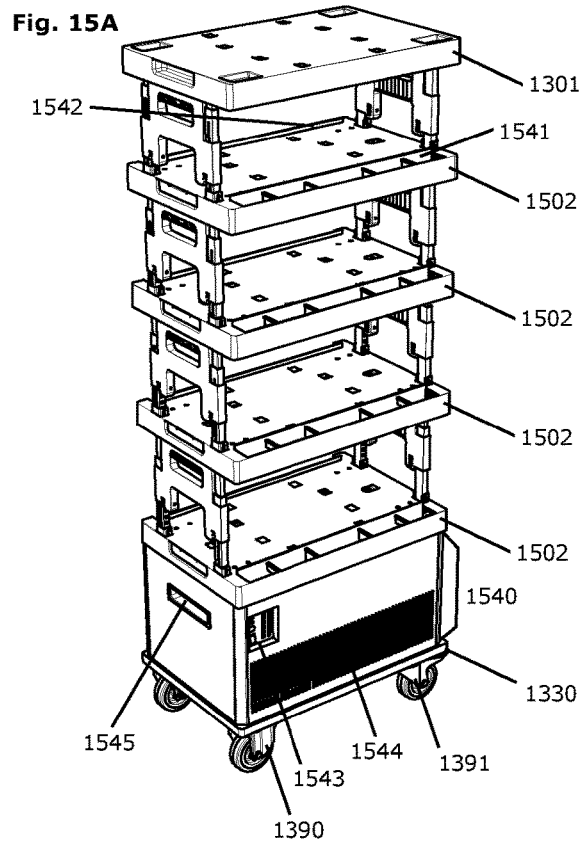
FIGS. 15A-15D are detailed illustrations of embodiments of displays according to the present invention comprising a cooling installation.
Figure 15B:
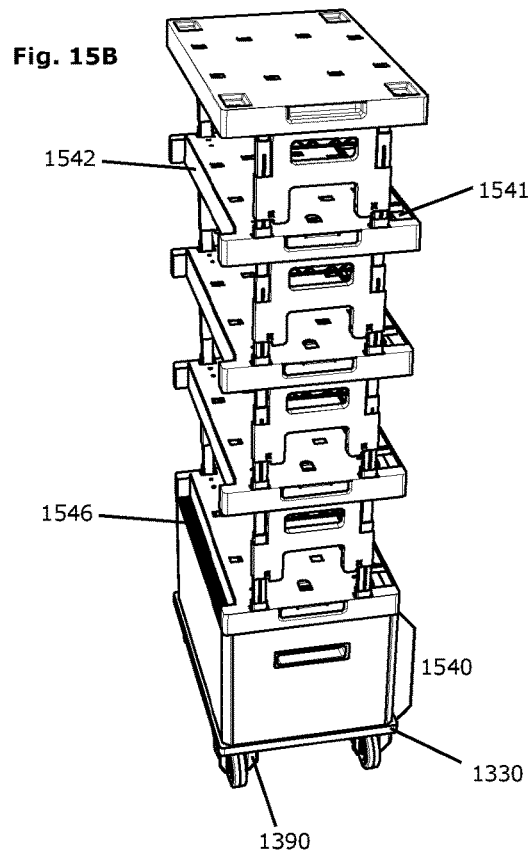
Figure 15C:
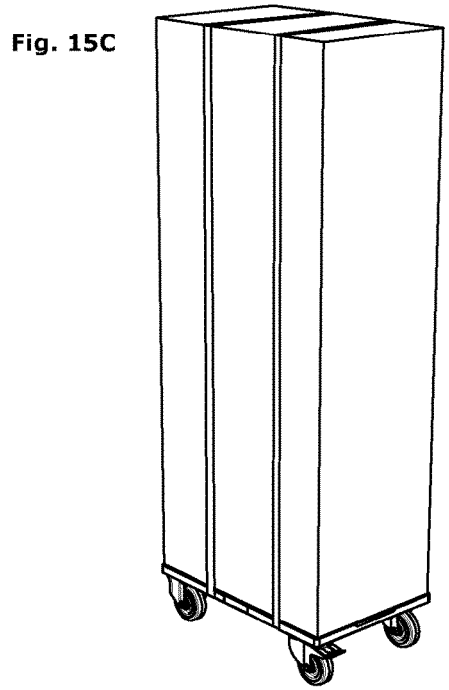
Figure 15D:
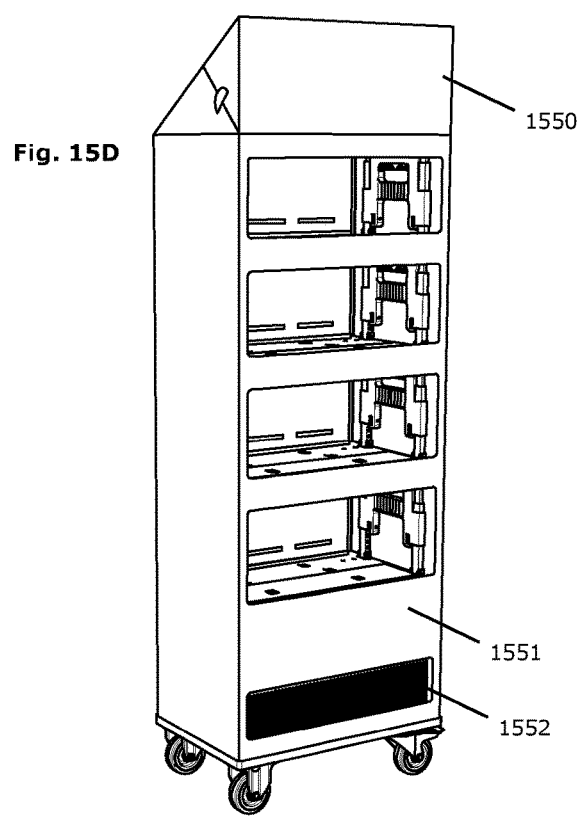

FIGS. 9 and 10 show two shelves. A display comprises at least two shelves, such as two, three, four, five, six, seven, eight, nine, ten, eleven, twelve, thirteen, fourteen, fifteen, sixteen, seventeen, eighteen, nineteen, twenty or more shelves. The display comprises a number of pairs of side walls equal to one less than the number of shelves. FIG. 11 shows a detailed illustration analogous to FIG. 10, but with several shelves, more in particular six shelves. The display in FIG. 11 comprises four wheels (1390, 1391). Two of the wheels (1391) can be rotated. One of the rotatable wheels comprises a braking system. The wheels are mounted on a lower frame (1350; see FIG. 13), onto which a lower shelf (1303) has been mounted. The lower shelf (1303) comprises a lath (1330) for supporting the housing (602, 603) of the kit (see FIG. 14). Furthermore, the display of FIG. 11 comprises several intermediate shelves (1302) and an upper shelf (1301), as well as a plurality of pairs of side walls (1304, see FIG. 12). FIG. 12 shows a detailed illustration of the build-up of the display of FIG. 11, analogous to FIG. 9. The display is transformed from a transport configuration (FIG. 12A) to an intended configuration (FIG. 12N).

A telescopic side wall (1304) comprises (see FIG. 13):
 a frame (1307, 1311);
 two telescopic elements (1306) each comprising recesses; and
 an attachment system (1308, 1309, 1310, 1314) comprising two attachment elements (1314) that can be moved with respect to each other. The frame (1307, 1311) is composed of a framework (1307) and two elongated rods (1311). The two elongated rods (1311) each comprise at an upper side one or more openings for passing through an elongated connection element (1322). The framework (1307) also comprises at an upper side holes for passing through the elongated connection element (1322). The attachment system (1308, 1309, 1310, 1314) comprises a transfer element (1308), two springs (1310) and an upper rod (1309). The upper rod is provided for passing through the connection element (1322). The attachment system (1308, 1309, 1310, 1314) can be brought into the framework (1307). The elongated rods (1311) can also be brought into the framework (1307). By putting the connection element (1322) through the openings in the frame (1307) provided thereto, the elongated rods (1311) and the upper rod (1309), as well as through corresponding sliding recesses (1321) in the upper shelf, the assembly (1305) can be subsequently attached to the upper shelf in a sliding way. Through relative movement of the transfer element (1308) with respect to the frame (1307, 1311), with compression of said springs (1310), the attachment elements are moved and the telescopic elements (3106) can be brought over the elongated rods (1311). Via a protrusion element (1312), the sliding of a telescopic element (1306) of an elongated rod (1311) can be prevented. The attachment elements can be positioned in the recesses of the telescopic elements (1306) for fixation of the telescopic elements (1306) with respect to the frame (1307, 1311). Through relative movement of the transfer element (1308) with respect to the frame (1307, 1311), with compression of said springs (1310), the attachment elements are taken out of the recesses and the telescopic elements (1306) can slide over the elongated rods (1311), as far as the protrusion elements (1312) allow this.

Each of the lower shelf (1303), the intermediate shelves (1302), and the upper shelf (1301) comprises a covering plate from glass fibre reinforced polypropylene and an aluminium frame (1320, 1323 1324, 1325, 1326). The aluminium frame of the upper shelf (1301) and the intermediate shelves (1302) comprise said sliding recesses (1321) for passing through a connection element (1322). The aluminium frame of the lower shelf (1303) and the intermediate shelves (1302) further comprise a pair of attachment means, in which each attachment means comprises four hinging openings (1324) for hinging the sliding elements (1306) of a side wall to the attachment means with two elongated connection systems (1313). The hinging openings (1324) are further configured for sinking the side wall into the shelf in an essentially perpendicular way to the shelf. Because the sunk parts are at least partially surrounded by the shelf, they are positioned in a stable way. The aluminium frame of the lower shelf (1303) and the intermediate shelves (1302) further comprise a locking system (1325, 1326) for avoiding that the sunk side wall is taken out of the shelf by telescopically extending the side wall. The locking system can be reached via openings (1393, 1393') in the corresponding covering plates.

The covering plate of the upper shelf (1301) further comprises four recesses (1392) for positioning in a sunk way the wheels of another display with an identical wheel positioning. This is illustrated in FIG. 17A. Several layers of displays in transport configuration can be stacked on a standard pallet (1704) in this way. The shelves of the display comprise an essentially rectangular upper side. Each of the upper sides comprises an in essence same length dimension and in essence same width dimension. The dimensions are appropriate for covering at least 95% of the supporting surface of a standard pallet with a total number of non-overlapping rectangles with this length and width dimension. The lath (1330) of the lower shelf (1303) comprises a rectangular shape with a length dimension of about 600 mm and a width dimension of about 400 mm, so that four displays can be placed next to each other on a standard pallet of about 800 mm to about 1200 mm. The standard pallet (1704) is preferably provided with a pallet covering plate (1705) with recesses or openings corresponding to the wheel positioning of four displays that are placed next to each other.

Figure 17B:
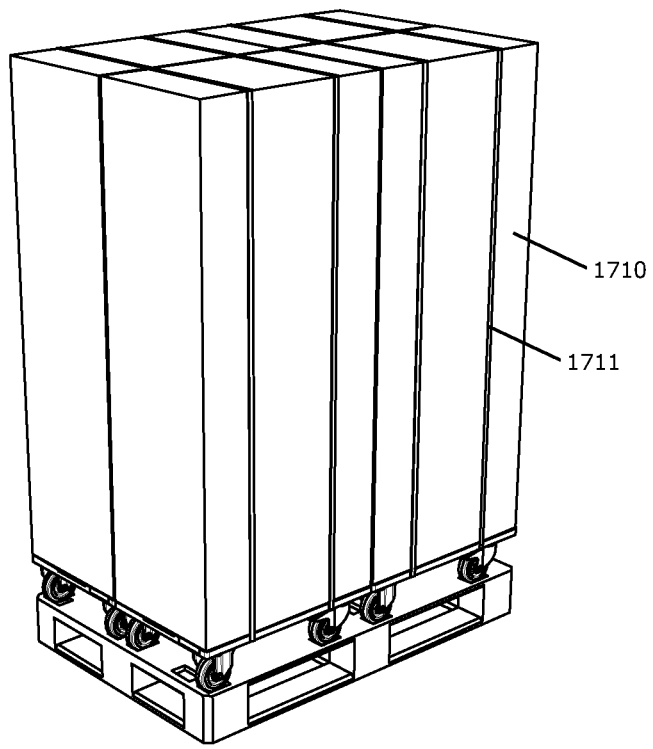
Figure 17A:
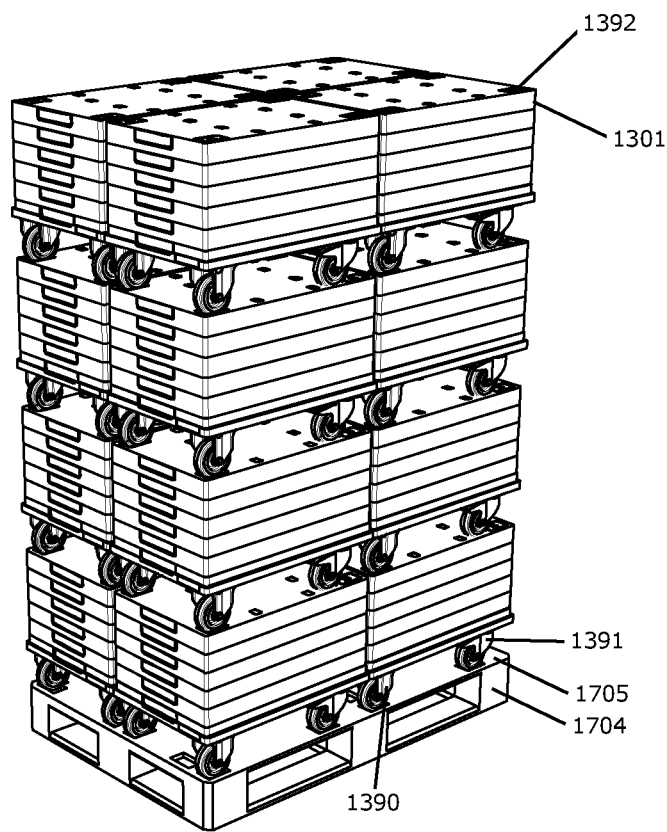

Furthermore, such a standard pallet (1704) with pallet covering plate (1705) can also be used for transporting four filled displays that have been placed next to each other (see FIG. 17B). The filled displays can hereby be provided with a housing (602, 603; see FIG. 14) and/or a protection cover (1710). Further, a covered and filled display can be enclosed by cords (1711), e.g. from synthetic material. In an embodiment, the housing (602, 603) comprises cardboard. In an alternative preferred embodiment, the housing comprises a synthetic material, more preferably expanded polystyrene, such as e.g. Archi-foam.

Preferably, the standard pallet (1704) comprises a transponder comprising a location sensor, a temperature sensor, a shock sensor, a weight sensor, a module for wireless communication, and a tangible non-transitory computer-readable storage medium for logging sensor data when the module cannot communicate with a gateway. Preferably, the standard pallet (1704) is an Ahrma pallet.

Example 7

This example relates to a modification of the display of example 6, in which the display comprises a cooling installation. The cooling installation is preferably located at the bottom of the display, but can alternatively also be located at the top. In another preferred embodiment, each shelf is provided with a cooling element.

FIG. 15 shows the modifications with respect to the display that has been described in example 6. At the bottom, the display comprises a cooling installation (1540). The display comprises the same upper shelf (1301) and modified intermediate shelves (1502). The modified intermediate shelves (1502) comprise at a first side (of the covering plate) a gridded set of openings (1541) for air flow. Further, the modified intermediate shelves can also comprise at a second side, opposite to the first side, a second provision (1542) for air flow. This second provision can comprise a gridded set of openings, but can alternatively also comprise one single opening. The cooling installation (1540) preferably comprises a pair of recesses (1545) appropriate as handles, a control panel (1543), a grid (1544) for external air flow, and flow grids (1546) corresponding to the gridded set of openings (1541), and if present the second provision (1542), for air flow. A modified housing (1550) can cover (1551) the control panel, but leaves the grid for external air flow (1544) at least partially uncovered. Preferably, the display also comprises a lath (1330) just above the wheels (1390, 1391) for supporting the housing.

The cooling installation preferably comprises a rechargeable battery, so that the cooling installation can also ensure cooling during transport of a covered and filled display.

Example 8

Figure 16:
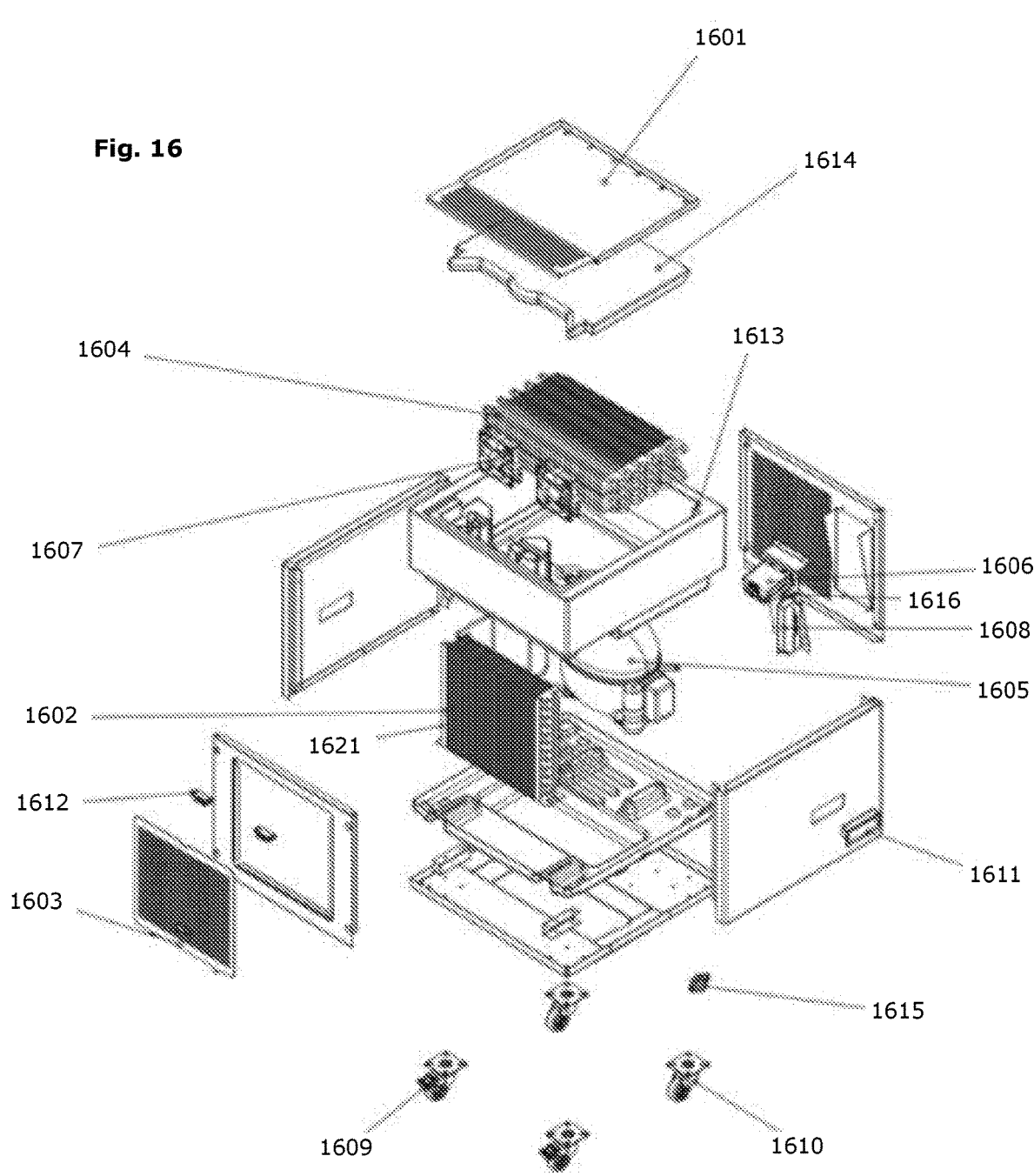
FIG. 16 is a detailed illustration of different components of a cooling installation for an embodiment of a display according to the present invention.

FIG. 16 shows an embodiment of a cooling installation for a display according to the present invention.

The cooling installation comprises an evaporator (1604) comprising ventilators (1607), a housing for the evaporator (1613) comprising an evaporator covering plate (1614), a compressor (1605), and a condenser (1602) comprising a ventilator (1621). Further, the cooling installation comprises a battery (1608) and a controller (1606). The cooling installation also comprises a housing comprising a top plate (1601) comprising a flow grid, a removable pregrid (1603) that can be attached via magnets (1612), handles (1611), wheels with (1609) and without (1610) brake, and drainage plug (1615), and a connection plug (1616) for a charging cord. The cooling installation further also comprises a refrigerant, such as e.g. R290.

Example 9

This example describes an embodiment of a display system for machine-executed building-up, covering and filling a display. A person with normal knowledge in the field will appreciate that the same system and/or an analogous system can be used for dismantling and folding a display.

The display system comprises a build-up system and a filling system.

A stack of displays is delivered in the transport configuration on a standard pallet (1704), as described in example 6. A column of the standard pallet is taken from the pallet and delivered to the build-up system. First, the column is taken from the stack by lifting the one but last bottom display and displacing the bottom display. Subsequently, the displaced display is set up by clamping in pairs adjacent shelves and displacing them vertically with respect to each other. Hereby, the side walls are automatically at least partially put upright when vertically displacing said adjacent shelves with respect to each other. A pair of arms hooks into a hole, preferably a hole at the attachment system, of each of the side walls for fully putting upright the side walls. The vertical forces through the relative vertical displacement are indeed essentially perpendicular to the desired sliding direction of the slideable attachment once the side walls are almost, but not yet completely put right. Subsequently, the side walls are at least partially sunk in the underlying shelf and locked. Said arms, or another pair of arms, moves for each of the pair of side walls the attachment system relatively with respect to the frame, and the side walls are telescopically extended. This process is repeated from top to bottom until the intended configuration of the display has been obtained.

Optionally, the display is covered in the intended configuration with the housing of the kit before filling the display.

The filling system comprises a forming platform with a size corresponding to the fillable part of a shelf of the display. The products are pushed from a production line onto the forming platform row by row. The filling system further comprises a robot gripper comprising a fork board. The fork board can take in the whole layer of the forming platform. The gripper is also provided with standing polished edges operative as a guiding hopper when placing the layer in a section of the display. The robot brings the fork board with products onto it in the section. The front side of the gripper is tapered by means of flexible synthetic strips. This prevents that the gripper gets stuck when it is introduced into the section. The front side of the gripper remains with a plate at the front side of the section, while the fork board with side walls is withdrawn from the section. In this way, the products are placed into the section. The robot starts with the bottom section and subsequently fills the remaining sections of the display in a similar way.

Example 10

Alternatively to example 9, a display can comprise a build-up system itself. The build-up system can comprise motors, e.g. motors that can generate a torsion in the hinging connection of a side wall for building up or collapsing the side walls. The build-up system can thus for each of the operations (building up side walls, sinking side walls, locking side walls, telescopically extending side walls) comprise the necessary actuators.

Further, an application can be provided for a user device (e.g. a smart phone) for sending a build-up message to a module for wireless communication of the display. When receiving the build-up message, the actuators can then be actuated appropriately for building up the display to an intended configuration. Preferably, the build-up message comprises information relating to the desired intended configuration.

The invention claimed is:

1. A display for displaying goods, the display comprising a first shelf, a second shelf and a pair of telescopic planar side walls, the display being configured for hingedly connecting the side walls to the first shelf and slideably attaching the side walls to the second shelf, the display further comprises a positioning element for each side wall, wherein said positioning element is for restraining and supporting the respective side wall; wherein the telescopic sidewalls have upper planar sections extending across upper portions slidable over lower sections of the telescopic side walls that are hingedly connected to the first shelf.

2. The display according to claim 1, the display comprising the pair of planar side walls for supporting the second shelf, each of the side walls comprising a lower edge and an upper edge, in which
   the first shelf is arranged for hingedly connecting both lower edges of the pair of side walls;
   the second shelf is arranged for slideably attaching both upper edges of the pair of side walls;
   each of the side walls is arranged telescopically for setting at least two different distances between the lower edge and the upper edge, in which the lower edges of the pair of planar side walls that are hingedly connected to the first shelf and the upper edges of the planar side walls that are slideably attached to the second shelf comprise a supporting configuration in which the side walls are substantially perpendicular to both the first and second shelves, in which the pair of planar side walls can be collapsed towards each other from the supporting configuration.

3. The display according to claim 2, the planar side walls comprising horizontal connectors which are integral to vertical elongated elements.

4. The display according to claim 1, in which the first shelf comprises a pair of attachment means, each attachment means comprising two or more hinge openings for hingedly connecting each side wall to the attachment means by means of one or more elongated connection systems, in which the hinge openings of the attachment means are further configured for at least partially moving a lower part of each side wall into the first shelf, wherein the lower part of each side wall is at least partially surrounded by the first shelf.

5. The display according to claim 4, in which the display comprises a locking system for preventing the lifting of the lower part of each side wall from the first shelf when telescopically extending the respective side wall.

6. The display according to claim 1, in which one telescopic side wall comprises:
   a frame;
   one or more telescopic elements comprising recesses, the one or more telescopic elements being telescopic with respect to the frame; and
   an attachment system comprising two attachment elements that can be moved with respect to each other, in which the attachment system is configured for being applied to the frame and for attaching the frame with respect to the one or more telescopic elements by means of positioning the attachment elements in recesses of the one or more telescopic elements.

7. The display according to claim 1, comprising at least three wheels, wherein one or more of the wheels comprises a braking system.

8. The display according to claim 1, in which the first and the second shelf each comprise a rectangular upper side, each of the rectangular upper sides comprising substantially the same length dimension and substantially the same width dimension, the dimensions being appropriate for covering at least 90% of a supporting surface of a standard pallet.

9. The display according to claim 1, in which at least one of the first shelf, the second shelf and the side walls comprises a metal or an alloy.

10. The display according to claim 1, the display comprising a communication module and at least one of a weight sensor, a temperature sensor, a location sensor, a gas sensor, a humidity sensor, an infrared sensor, an eye detection system, a camera, a Wi-Fi tracker, a Bluetooth low-energy beacon, a promotion chip, and an electronic price indicator.

11. The display according to claim 1, in which the display comprises a cooling installation.

12. The display according to claim 1, wherein the lower sections of the telescopic planar side walls are planar.

13. A kit comprising a display according to claim 1 and a housing for the display, the display comprising an intended configuration, the kit being arranged for attaching the housing to the display in the intended configuration, the housing comprising an advertisement wall, the advertisement wall being appropriate for at least partially covering the shelves and/or the side walls of the display in the intended configuration, the advertisement wall of the attached housing further being configured for taking off products of at least one of the shelves.

14. A method for spacing a first and a second shelf for displaying goods, the method comprising the steps of:
   providing two planar side walls for supporting in a spaced way the second shelf on the first shelf, the second shelf being positioned on the first shelf, the side walls being positioned between the first and the second shelf, the side walls being substantially parallel to both shelves, each of the side walls comprising first upper edges and second edges;
   providing a positioning element for supporting the side walls;
   exerting an upward force onto the second shelf and thereby on the upper edges of the planar side walls:
      a. sliding the first upper edges of the planar side walls parallel to a surface of the second shelf
      b. rotating the planar side wall around a rotation axis, in which the rotation axis is coaxial to the second edges and parallel to a surface of the first shelf;
      c. maintaining the distance between the first shelf and the second edge with the planar side walls.

15. The method according to claim 14 for spacing the first and the second shelf of a display.

16. A method for spacing a first shelf and a second shelf for displaying goods, the method comprising the steps of:
   providing two planar side walls for supporting in a spaced way the second shelf on the first shelf, the second shelf being positioned above the first shelf, the planar side walls being positioned between the first and the second shelf, the planar side walls being substantially parallel to both shelves, each of the planar side walls comprising a first upper edge and a second lower edge;
   providing a positioning element for supporting the side walls;
   exerting an upward force onto the second shelf and thereby on the side walls:
      a. sliding the first upper edge in essence parallel to a surface of one of the shelves; and
      b. rotating the side wall around a rotation axis, in which the rotation axis is essentially coaxial to the second lower edge and in essence parallel to a surface of one of the shelves; and
   changing the distance between the first and the second edge, in which the sliding (step a.) and the rotating (step b.) are accomplished simultaneously and for both side walls at the same time till both side walls are positioned essentially perpendicular to both shelves, after which the changing of the distance between the first and the second edge (step c.) is accomplished simultaneously for both side walls.

17. The method according to claim 16, in which said steps are machine-executed.

* * * * *